(12) United States Patent
Torfs et al.

(10) Patent No.: US 9,938,420 B2
(45) Date of Patent: Apr. 10, 2018

(54) DIGITAL FABRICATION OF METALLIC ARTICLES

(71) Applicant: AGFA-GEVAERT, Mortsel (BE)

(72) Inventors: Rita Torfs, Mortsel (BE); Roel De Mondt, Mortsel (BE); Blanca Maria Pastor Ramirez, Mortsel (BE); Johan Loccufier, Mortsel (BE)

(73) Assignee: AGFA-GEVAERT, Mortsel (BE)

( * ) Notice: Subject to any disclaimer, the term of this patent is extended or adjusted under 35 U.S.C. 154(b) by 0 days.

(21) Appl. No.: 15/514,585

(22) PCT Filed: Jun. 1, 2015

(86) PCT No.: PCT/EP2015/062105
§ 371 (c)(1),
(2) Date: Mar. 27, 2017

(87) PCT Pub. No.: WO2016/050371
PCT Pub. Date: Apr. 7, 2016

(65) Prior Publication Data
US 2017/0226355 A1   Aug. 10, 2017

(30) Foreign Application Priority Data
Sep. 29, 2014   (EP) .................................. 14186726

(51) Int. Cl.
*B44C 1/22*       (2006.01)
*C03C 15/00*      (2006.01)
(Continued)

(52) U.S. Cl.
CPC .............. *C09D 11/101* (2013.01); *B41J 2/01* (2013.01); *B41M 5/0023* (2013.01);
(Continued)

(58) Field of Classification Search
USPC .......................................................... 216/48
See application file for complete search history.

(56) References Cited

U.S. PATENT DOCUMENTS

| 4,636,534 A | 1/1987 | Nawata et al. |
| 2011/0020970 A1 | 1/2011 | Caiger |
| 2013/0186672 A1 | 7/2013 | Kariya et al. |

FOREIGN PATENT DOCUMENTS

| EP | 0 588 533 A2 | 3/1994 |
| EP | 2 042 574 A1 | 4/2009 |

(Continued)

OTHER PUBLICATIONS

Official Communication issued in International Patent Application No. PCT/EP2015/062105, dated Aug. 10, 2015.

*Primary Examiner* — Roberts Culbert
(74) *Attorney, Agent, or Firm* — Keating and Bennett, LLP

(57) ABSTRACT

A method of manufacturing metallic articles from a metal substrate includes the steps of: a) jetting an image with a UV curable inkjet ink on at least one surface of the metallic substrate; b) UV curing the image; c) electroplating or acidic etching the at least one metallic surface not covered by the UV cured image; and d) stripping or solubilizing the UV cured image by an aqueous alkaline solution; wherein the UV curable inkjet ink has a viscosity of no more than 100 mPa·s at 25° C. and at a shear rate of $1,000\ \text{s}^{-1}$; and wherein the UV curable inkjet ink contains a specific polymerizable composition and up to 20 wt % of photoinitiator including at least one of an acyl phosphine oxide photoinitiator and a thioxanthone photoinitiator.

15 Claims, 3 Drawing Sheets

(51) Int. Cl.

| | |
|---|---|
| *C03C 25/68* | (2006.01) |
| *C23F 1/00* | (2006.01) |
| *C09D 11/101* | (2014.01) |
| *C09D 11/328* | (2014.01) |
| *C09D 11/107* | (2014.01) |
| *B41J 2/01* | (2006.01) |
| *B41M 5/00* | (2006.01) |
| *B41M 7/00* | (2006.01) |
| *C25D 5/02* | (2006.01) |
| *C23F 1/16* | (2006.01) |

(52) U.S. Cl.
CPC ........ *B41M 5/0047* (2013.01); *B41M 5/0058* (2013.01); *B41M 7/0009* (2013.01); *B41M 7/0081* (2013.01); *C09D 11/107* (2013.01); *C09D 11/328* (2013.01); *C23F 1/16* (2013.01); *C25D 5/022* (2013.01); *B41M 2205/14* (2013.01); *B41M 2205/18* (2013.01)

(56) References Cited

FOREIGN PATENT DOCUMENTS

| | | |
|---|---|---|
| EP | 2 085 439 A1 | 8/2009 |
| EP | 2 145 932 A1 | 1/2010 |
| JP | 2008-156443 A | 7/2008 |

DIGITAL FABRICATION OF METALLIC ARTICLES

CROSS REFERENCE TO RELATED APPLICATIONS

This application is a 371 National Stage Application of PCT/EP2015/062105, filed Jun. 1, 2015. This application claims the benefit of European Application No. 14186726.7, filed Sep. 29, 2014, which is incorporated by reference herein in its entirety.

BACKGROUND OF THE INVENTION

1. Field of the Invention

The present invention relates the digital fabrication of metallic articles, more specifically metallic articles manufactured using inkjet technology.

2. Description of the Related Art

Inkjet printing systems are being installed for different industrial applications because of their enhanced reliability and their flexibility in use, such as variable data printing making short production runs and personalized products possible at low cost.

Metallic articles or components are conventionally made using CNC machines. The initial startup cost is high due to the setup of CNC machines, but the cost per component is then usually reduced by volume production. Generally the cost also increases with the shape complexity. Sometimes, the shape complexity becomes too high to be economically viable or even too complex to be produced by these conventional tools.

3D inkjet printing is today offered as an industrial inkjet production tool. Most 3D inkjet printing systems deliver articles formed in an organic material and not in metal. There is one 3D inkjet printing system available, known as the Digital Metal™ technology from Höganäs (see: http://www.hoganas.com/en/business-areas/digital-metal/technology/), which delivers inkjet printed stainless steel components and possibly in the future also titanium, silver and copper components. The technology involves printing the stainless steel component layer by layer by jetting an ink on a metal powder, followed by sintering for strength and a surface quality improving treatment, such as peening, blasting or tumble finishing. The technology offers tolerances of 100 μm, with holes and wall thicknesses down to 200 μm. The layer by layer inkjet printing, as well as the energy-consuming sintering and the surface finishing decrease the productivity substantially. Furthermore, metallic articles having details below 100 μm and thickness of less than 200 μm cannot be produced by this technology.

Another method for manufacturing metallic articles is disclosed by US 2011020970 (SUN CHEMICAL), which discloses a process of etching or plating comprising the steps of: i) ink jet printing an alkali removable water insoluble hot melt ink jet ink onto a substrate to form a resist image; ii) etching or plating the substrate in an aqueous acid medium; and iv) removing the resist image with an aqueous alkali. A hot melt ink is solid at 25° C. This physical property has a large advantage in the achievable image quality on a cold metal surface as it solidifies rapidly after a jetted ink droplet lands on the metal surface. However, this physical property also has a detrimental effect on productivity. Etching speed is reduced as it has to be performed at lower temperatures, usually around room temperature to 35° C., where the ink does not melt or soften. For accelerating the removal of ink, organic solvents are often added to remove water insoluble hot melt ink jet inks from a metal surface.

Hence, there is still a need for improved digital fabrication methods of metallic articles allowing short production runs at high productivity and at low cost and this for a wide variety of metals and alloys.

SUMMARY OF THE INVENTION

In order to overcome the problems described above, preferred embodiments of the present invention have been realised with a method of manufacturing metallic articles from a metal substrate as defined below.

It was found that very complex metallic articles having details below 100 μm could be made using specific UV curable inkjet inks. It was also possible to efficiently decorate the metallic articles with UV curable colour inkjet inks, while undesired UV curable inkjet ink could be effectively removed from the metallic surface after etching or metal plating by dissolving it in an alkaline aqueous solution.

By including specific photoinitiators, the UV curable inkjet ink could be cured fast using UV LEDs which lead to superior image quality on the metallic surface.

Further advantages and embodiments of the present invention will become apparent from the following description.

BRIEF DESCRIPTION OF THE DRAWINGS

In FIG. 2A, a frame (10) is firmly mounted on a metal substrate (1). In FIG. 2B, which is a cross-section along the dotted line shown in FIG. 5A, the metal substrate (1) is first tilted under an angle α and then an etchant inlet (11) is positioned on one side of the frame (10). Etchant flows in a direction (120) through the etchant inlet (11), whereafter it flows in a direction (13) over the surface of the metal substrate (1), before being evacuated in a direction (14) via the etchant outlet (15). Depending on the angle α, the etchant is recirculated a plurality of times from the etchant outlet (152) to the etchant inlet (11).

which is higher than a second metallic relief (9) and a metallic relief colored on its top by the non strippable UV cured image (8).

Figure 4:
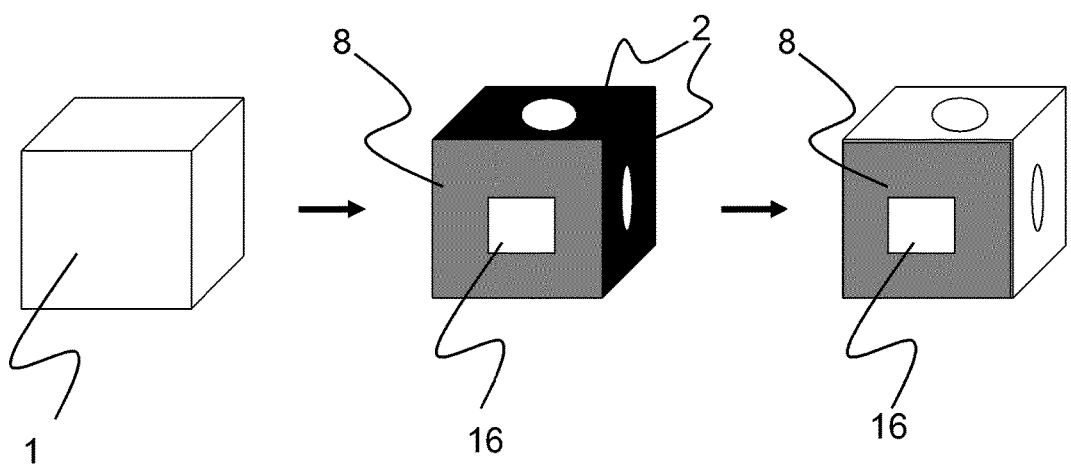

FIG. 4 shows a metal substrate (1) having a cubic shape. A UV cured image (2) is inkjet printed on the top side and the right side of the cube, while the front side is inkjet printed with a non strippable UV cured image (8). After etching and stripping, the front side has a square hole (8) surrounded by the non strippable UV cured image (8) giving the front side a colour. The UV cured images (2) around the circular holes is removed by stripping, showing again the metal as surface.

Figure 5:
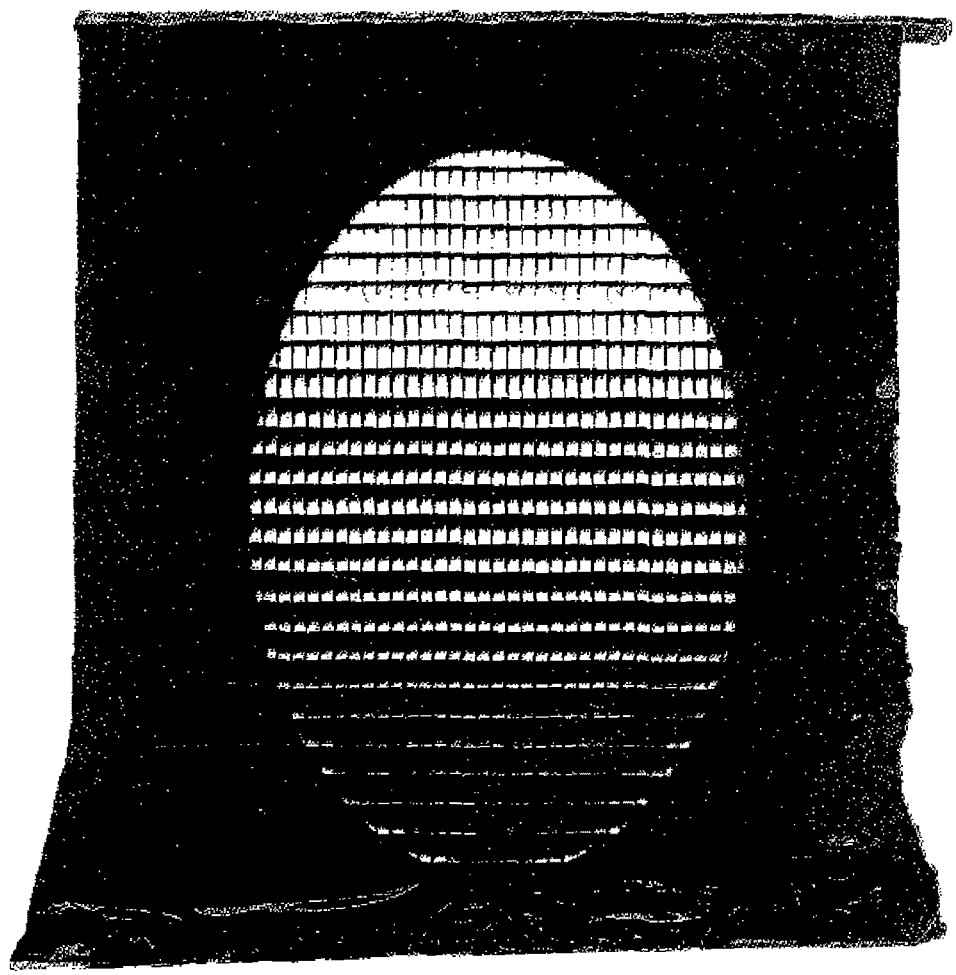

FIG. 5 shows a photograph of a metallic article made in Example 5. The metallic article is an oval fine screen having decreasing pore sizes from top to bottom on the photograph.

DETAILED DESCRIPTION OF THE PREFERRED EMBODIMENTS

Definitions

The term "monofunctional" in e.g. monofunctional polymerizable compound means that the polymerizable compound includes one polymerizable group.

The term "difunctional" in e.g. difunctional polymerizable compound means that the polymerizable compound includes two polymerizable groups.

The term "polyfunctional" in e.g. polyfunctional polymerizable compound means that the polymerizable compound includes more than two polymerizable groups.

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably a phenyl or naphthyl group including one, two, three or more $C_1$ to $C_6$-alkyl groups.

Unless otherwise specified a substituted or unsubstituted alkaryl group is preferably a $C_7$ to $C_{20}$-alkyl group including a phenyl group or naphthyl group.

Unless otherwise specified a substituted or unsubstituted aryl group is preferably a phenyl group or naphthyl group.

Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms.

Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester, amide, ether, thioether, ketone, aldehyde, sulfoxide, sulfone, sulfonate ester, sulphonamide, —Cl, —Br, —I, —OH, —SH, —CN and —NO$_2$.

Methods of Manufacturing Metallic Articles

A method of manufacturing metallic articles (5) from a metal substrate (1) according to a preferred embodiment of the invention including the steps of: a) jetting an image with a UV curable inkjet ink on at least one surface of the metallic substrate; b) UV curing the image (2); c) metal plating or acidic etching the at least one metallic surface not covered by the UV cured image; and d) stripping or solubilising the UV cured image by an aqueous alkaline solution; wherein the UV curable inkjet ink has a viscosity of no more than 100 mPa·s at 25° C. and at a shear rate of 1,000 s$^{-1}$; and wherein the UV curable inkjet ink contains: up to 20 wt % of photoinitiator including at least one of an acyl phosphine oxide photoinitiator and a thioxanthone photoinitiator; and a polymerizable composition selected from the group consisting of: a polymerizable composition A, wherein at least 80 wt % of the polymerizable composition consists of: a) 15.0 to 70.0 wt % of an acryl amide; b) 20.0 to 75.0 wt % of a polyfunctional acrylate; and c) 1.0 to 15.0 wt % of a monofunctional (meth)acrylate containing a carboxylic acid group; with all weight percentages (wt %) based on the total weight of the polymerizable composition; and a polymerizable composition B containing: a) one or more hydrolyzable polyfunctional monomers or oligomers having at least one alkali hydrolyzable group located in the atomic chain between two polymerizable groups of the polyfunctional monomer or oligomer; and b) one or more water absorption controlling monomers being a monofunctional or difunctional monomer containing at least one functional group selected from the group consisting of a hydroxyl group, an ethylene oxide or oligo-ethylene oxide group, a tertiary amine group, an acidic group having a pK$_a$ not lower than 3 and a five to seven membered aromatic or non aromatic heterocyclic group.

Figure 3:
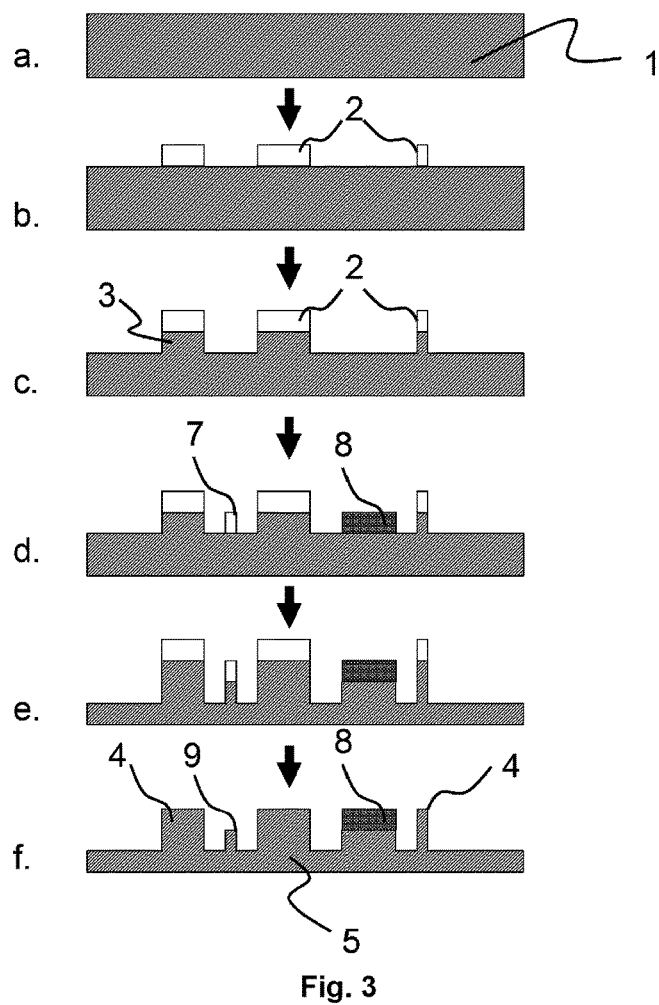
FIG. 3 shows a preferred embodiment of the method for manufacturing metallic articles from a metal substrate having a partly colored metallic relief. First, a UV cured image (2) is inkjet printed on a metal substrate (1). Then, metal is etched away from unprotected metal surface, while the metal protected by the UV cured image (3) remains substantially intact. A second UV cured image (7) and a non strippable UV cured image (8) is inkjet printed on the metallic surface. Again metal is etched away from unprotected metal surface. After stripping or solubilizing the UV cured image (2) and the second UV cured image (8), a metallic article (5) is obtained having a relief containing a metallic relief (4)

In a preferred embodiment, before or after step d) a UV curable inkjet ink is used for jetting and UV curing a second image on at least one surface of the metallic substrate, followed by metal plating or acidic etching. An example of this is illustrated by FIG. 3, where a metallic relief (4) and a second metallic relief (9) of different heights are created.

In another embodiment, which incidentally may also be combined with the previous embodiment, a UV curable inkjet ink containing a colorant, preferably a colour pigment, is jetted wherein the UV cured image (8) thereof is not removed by stripping or solubilization using an aqueous alkaline solution. This is most preferably accomplished by using a non-strippable UV curable inkjet ink. Alternatively, if no other UV cured images have to be stripped or solubilized, the final treatment with an aqueous alkaline solution for stripping or solubilising may be omitted. The advantage of this is that relief part of a metallic article can be coloured or decorated which otherwise would be very difficult to accomplish. For example, as illustrated by FIG. 3, it is difficult to apply afterwards a coloured UV curable inkjet ink on metallic relief (9). Dipping the metallic relief (9) in colour ink bath would also apply colour to the metallic relief (4) which may not be desired.

It should be clear that not only a second UV cured image may be inkjet printed but that if desired a third, fourth, fifth, . . . UV cured image may be UV curable inkjet printed, each time followed by etching or metal plating as required to obtain the desired metallic article.

A UV cured image may be stripped after etching or metal plating, but preferably the UV cured image is solubilised by the aqueous alkaline solution. The advantage is that flakes from the UV cured image cannot get stuck in corners or holes of the metallic article.

The UV cured image is stripped from the metallic surface using an alkaline stripping solution, preferably free of organic solvent as this allows for eco-friendly recovery of the etched metal ions from the stripping solution. The stripped UV cured image flakes are recovered by filtration.

In the preferred embodiment, the UV cured image is stripped from the metallic surface and dissolved in the alkaline stripping solution. This stripping method also avoids problems of clogging of filters by UV cured image flakes.

Referred metallic articles that can be made with the manufacturing method of the invention include a metallic article is selected from the group consisting of die cutting tools, fine screens and meshes, apertures and masks, battery grids, fuel cell components, sensors, springs, pressure membranes, heat sinks, heating elements, mechanical components, semiconductor lead frames, motor and transformer laminations, metal gaskets and seals, shields and retainers, electrical contacts, encoders and light choppers, EMI/RFI shields, jewellery and washers, filters, spectacle frames, art objects, keys, tools, toys, coins, business cards and other readable objects.

Metallic Substrates

The metallic substrate is preferably a metallic substrate selected from the group consisting of iron, nickel, cobalt, copper, silver, gold, tantalum, aluminum, molybdenum, tungsten, tin, zinc, chromium, titanium, and alloys therewith.

The metallic substrate is preferably a metallic substrate selected from the group consisting of iron, nickel, cobalt, silver, gold, tantalum, aluminum, molybdenum, tungsten, tin, zinc, chromium, titanium, and alloys therewith.

Most preferably the metallic substrate is steel (iron carbon alloys) or a steel alloy such as Invar (nickel), Kovar (nickel, cobalt), and stainless steel.

In a preferred embodiment, the metallic substrate is an alloy of copper, such as beryllium copper, brass (zinc) and bronze (tin, aluminum)

In a preferred embodiment, the metallic substrate is an alloy of nickel and cobalt such as: Mu Metal, HyMu 80, Alloy 52, Elgiloy (Phynox), Kovar, Hastelloys, Inconels, Haynes alloys, and Nicrofer The metallic substrate is preferably self-supporting, meaning that the metallic substrate is not bonded to a non-metallic support such as e.g. ceramics, glass or plastics like polyimides.

There is no real limitation on the dimensions or shape of the metallic substrate. It can have a true 3 dimensional object like a sphere or a cube (as shown in FIG. 4). Alternatively it can be a metal plate or foil, preferably having a thickness of 15 μm to 5 mm.

Etching

Etching of the metal surface as in step c) is performed by using an acidic etchant. The etchant is preferably an aqueous solution having a pH<3.

In a preferred embodiment, the etchant is an acid aqueous solution having a pH of less than 2. The acid etchant preferably includes at least one acid selected from the group consisting of nitric acid, picric acid, hydrochloric acid, hydrofluoric acid and sulphuric acid.

Preferred etchants known in the art include Kalling's No 2, ASTM No 30, Kellers Etch, Klemm's Reagent, Kroll's Reagent, Marble's Reagent, Murakami's Reagent, Picral and Vilella's Reagent.

The etchant may also contain a metal salt such as copper dichloride, copper sulphate, potassium ferricyanide and iron trichloride.

The duration of etching is determined by the desired shape and relief heights. For reasons of productivity, the etching is preferably performed in a time frame of less than an hour, preferably in a time frame of 5 to 45 minutes, more preferably 10 to 30 minutes. An increase in temperature generally accelerates the etching. Etching is preferably performed at a temperature between 35 and 50° C.

In a preferred embodiment, etching is performed by spraying, preferably at a pressure of at least 1 bar, more preferably 1 to 2 bar. In the latter case, an optimal etching performance is achieved.

Before etching, the UV curable inkjet printed image is preferably given a heat treatment, preferably 10 to 45 minutes at 130 to 170° C., more preferably 20 to 30 minutes at 150° C.

Etching is preferably followed by rinsing with water to remove any residual etchant.

After etching, the UV cured image may be removed by stripping or solubilizing by an alkaline stripping solution. Such an alkaline stripping solution is usually an aqueous solution with a pH>10.

Metal Plating

Metal plating is the opposite of etching. Where etching removes metal from the metallic surface, metal plating deposits metal on the metallic surface.

There is no real limitation on the type of method used to deposit the metal. Preferred methods of metal plating are preferably selected from electroplating, electroless plating and (electro)galvanization, more preferably the metal plating is performed by electroless plating.

If metal plating is performed at different instances a combination of metal plating methods may be used, for example, electroless plating followed after inkjet printing a new UV cured image by galvanization.

As galvanization is mentioned, it should be clear that the metal deposited should not necessarily be the same as that of the metallic substrate. Deposition of a different metal may have advantageous effect on the final metallic article. For example, electrogalvanization is a process in which a layer of zinc is bonded to steel in order to protect against corrosion. The process involves electroplating, running a current of electricity through a saline/zinc solution with a zinc anode and steel conductor.

Electroplating

Electroplating is a process that uses electric current to reduce dissolved metal cations so that they form a coherent metal coating on an electrode. In a preferred embodiment, the electrode is the metallic substrate.

As to the method of performing electroplating, any conventionally known method can be used. Examples of a metal which may be used in the electroplating include copper, chrome, lead, nickel, gold, silver, tin, and zinc.

The thickness of the metal layer deposited obtained by electroplating may vary according to the intended use, and can be controlled by adjusting the concentration of the metal contained in the plating bath, the current density, or the like.

Electroless Plating

Electroless plating, also known as chemical or autocatalytic plating, is a plating method that involves a chemical reaction in an aqueous solution without the use of external electrical power. The aqueous solution for the electroless process needs to contain the ions of the intended metal to be deposited and a reducing agent so that a chemical reaction can occur which has the form:

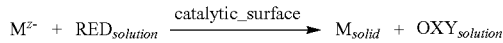

$$M^{z-} + RED_{solution} \xrightarrow{catalytic\_surface} M_{solid} + OXY_{solution}$$

In a preferred embodiment of the present invention, the catalytic surface is the metallic surface not protected by any UV cured image and $M_{solid}$ is the metal deposited on the metallic surface of the metallic substrate.

In principle any hydrogen-based reducer can be used although the redox potential of the reducer half-cell must be high enough to overcome the energy barriers inherent in liquid chemistry. For example, electroless nickel plating generally uses hypophosphite as the reducer while plating of other metals like silver, gold and copper typically use low molecular weight aldehydes.

A major benefit of this approach over electroplating is that power sources and plating baths are not needed, reducing the manufacturing cost. The technique can also plate diverse shapes and types of surface. The downside is that the plating process is usually slower and cannot create such thick deposits of metal.

Generally, the electroless plating bath includes as main components, in addition to a solvent, 1. a metal ion for plating, 2. a reducing agent, and 3. an additive (stabilizer) that enhances the stability of the metal ions. This plating bath may further contain a known additive, in addition to the above components.

There is no limitation on the metal ion used for plating. Frequently used metal ions include copper, tin, lead, nickel, gold, palladium, and rhodium.

The organic solvent used in the plating bath is preferably a solvent that is soluble in water, and from this point of view, ketones such as acetone, or alcohols such as methanol, ethanol, or isopropanol are preferably used.

There are preferable reducing agents and additives according to the type of the metal. These reducing agents are well-known in the art of conventional electroless plating and include e.g. boron-based reducing agents such as sodium borohydride or dimethylamine borane, and reducing agents such as formaldehyde or hypophosphorous acid.

For example, an electroless plating bath used for electroless plating of copper preferably includes CuSO4 as the salt of copper, HCOH as the reducing agent, and a chelating agent that serves as a stabilizer of the copper ion, such as ethylenediaminetetraacetic acid (EDTA) or Rochelle salt, trialkanolamine, or the like, as the additive.

An electroless plating bath used for electroless plating of CoNiP preferably includes cobalt sulfate and nickel sulfate as the metal salts thereof, sodium hypophosphite as the reducing agent, and sodium malonate, sodium malate, or sodium succinate as the complexing agent.

An electroless plating bath used for electroless plating of palladium preferably includes $(Pd(NH_3)_4)C_{12}$ as the metal ion, $NH_3$ or $H_2NNH_2$ as the reducing agent, and EDTA as the stabilizer.

These plating baths may further include components other than the above components.

Stripping and Solubilizing

The stripping solution or stripping bath is preferably an alkaline solution containing soda, potassium carbonate, alkaline metal hydroxides, such as sodium or potassium hydroxide, or based on amines such as mono or tri ethanolamine and tetra methyl ammonium hydroxide. A preferred stripping solution contains at least 2 wt % of sodium or potassium hydroxide. The stripping solution in use preferably has a temperature between 30° C. and 85° C., more preferably 40° C. to 55° C. The stripping solution is preferably substantially free of organic solvent and most preferably contains no organic solvent. The latter facilitates an eco-friendly recovery of metal from used stripping solutions. In a preferred embodiment, spraying is used to apply the stripping solution. Implementing pressure by using spraying during stripping will increase the stripping speed and improves the degradation speed of the flakes.

Figure 1:
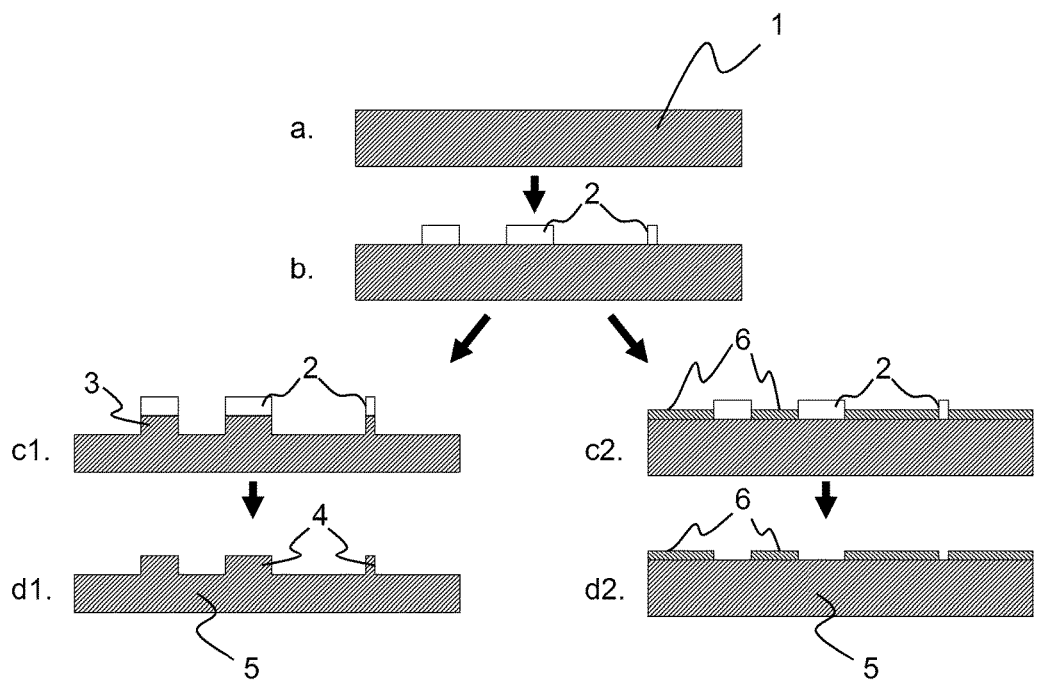
FIG. 1 shows preferred embodiments of the method for manufacturing metallic articles from a metal substrate. First, a UV cured image (2) is inkjet printed on a metal substrate (1). Then either in FIG. 1.c1, metal is etched away from unprotected metal surface, while the metal protected by the UV cured image (3) remains substantially intact. After stripping or solubilizing the UV cured image, a metallic article (5) is obtained having a certain metallic relief (4). Alternatively in FIG. 1.c2, metal (6) is deposited by metal plating, after stripping or solubilizing the UV cured image, a different metallic relief is obtained by the deposited metal (6) for the metallic article (5).
Figure 2:
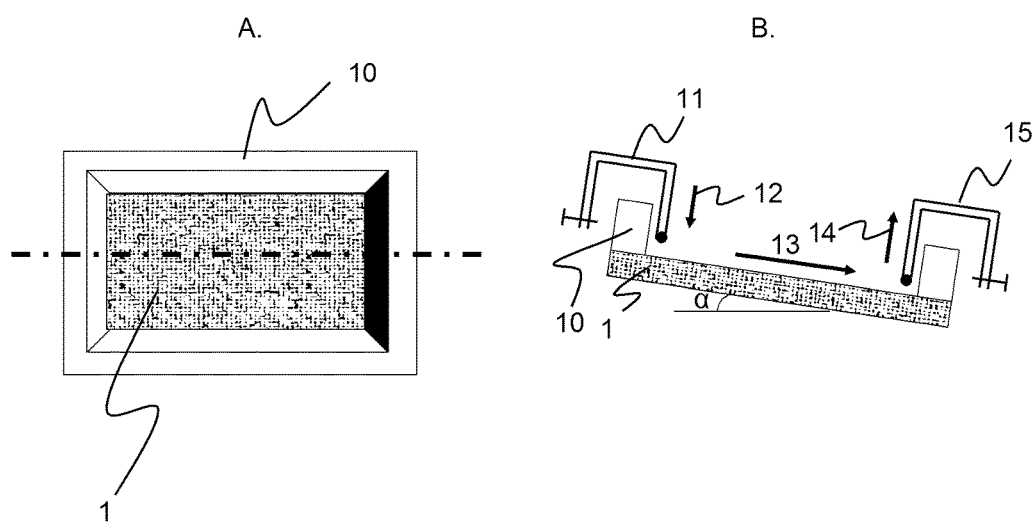
FIG. 2 shows a set-up for etching a metal substrate (1).

The equipment for performing the etching or metal plating and the stripping is dependent on the application and the dimensions of the metal substrate/article. A possible set-up for etching a metal plate is shown in FIG. 2. Alternatively an etch bath is used through which the metal substrate carrying the cured UV cured image(s) is transported at a controlled speed. A simple bath for etching/metal plating wherein the metallic substrate is submersed in the etchant/plating liquid for a certain time and heated at a certain temperature is the most straight forward concept of a suitable apparatus.

In a preferred embodiment, the metal surface is cleaned before printing the UV curable inkjet ink. This is especially desirable when the metal surface is handled by hand and no gloves are worn. The cleaning removes dust particles and grease which can interfere in the adhesion of the UV curable inkjet ink to the metal surface. Besides degreasing, roughness is preferably introduced by brushing or micro-etching the metal surface. This generally improves the adhesion of the UV curable inkjet ink to the metal surface, which results in an improved etch resistance.

UV Curable Inkjet Inks

The UV curable inkjet ink is printed on the metallic surface and UV cured to form a UV cured image that protects the metallic surface to which it adheres.

The UV curable inkjet ink may be cationically curable, but is preferably a free radical UV curable inkjet ink. The UV curable inkjet ink can be cured by e-beam, but is preferably cured by UV light, more preferably by UV light from UV LEDs.

After etching or metal plating, a UV cured image of the UV curable inkjet ink is normally stripped or otherwise solubilised by an aqueous alkaline solution. However, for decorative, protective or informative purposes a non-strippable UV curable inkjet ink may be inkjet printed where no (further) etching or metal plating is required.

For reliable industrial inkjet printing, the viscosity of the UV curable inkjet inks is preferably no more than 20 mPa·s at 45° C., more preferably between 1 and 18 mPa·s at 45° C., and most preferably between 4 and 14 mPa·s at 45° C.

For good image quality and adhesion, the surface tension of the UV curable inkjet inks is preferably in the range of 18 mN/m to 70 mN/m at 25° C., more preferably in the range of about 20 mN/m to about 40 mN/m at 25° C.

Non-Strippable UV Curable Inkjet Inks

Many UV curable inkjet inks are known in the art that exhibit excellent adhesion to a metal surface, however most of them cannot be stripped or solubilized.

The non-strippable UV curable inkjet ink preferably containing a colorant, preferably a colour pigment. The advantage of this is that a metal article has a decorative (coloured surface) or informative (e.g. safety instructions or a reference number on a mechanical component) UV cured image. For enhancing the durative purpose, multiple non-strippable UV curable inkjet ink having different colours may be used.

A colourless non-strippable UV curable inkjet ink may also be used. Such a UV cured image can then have a merely protective purpose, e.g. preventing corrosion.

Strippable UV Curable Inkjet Inks

After etching or metal plating, the UV cured image can be stripped from the metal surface into flakes by an aqueous alkaline solution. This means that the UV curable inkjet ink is resistant to an acidic etchant but not to an alkaline stripping bath. In order to achieve this, a specific UV curable inkjet ink composition is necessary.

In a particularly preferred embodiment, the UV curable inkjet ink includes a polymerizable composition, wherein at least 80 wt %, preferably at least 90 wt % and most preferably 100 wt % of the polymerizable composition consists of:

a) 15.0 to 70.0 wt % of an acryl amide;
b) 20.0 to 75.0 wt % of a polyfunctional acrylate; and
c) 1.0 to 15.0 wt % of a monofunctional (meth)acrylate containing a carboxylic acid group; with all weight percentages (wt %) based on the total weight of the polymerizable composition.

The above preferred UV curable inkjet ink includes at least 15.0 to 70.0 wt %, preferably at least 20.0 to 65.0 wt % and most preferably at least 30.0 to 60.0 wt % of an acryl amide in the polymerizable composition, with all weight percentages (wt %) based on the total weight of the polymerizable composition. A single acryl amide or a mixture of acryl amides may be used. Preferred acryl amides are disclosed in Table 1.

TABLE 1

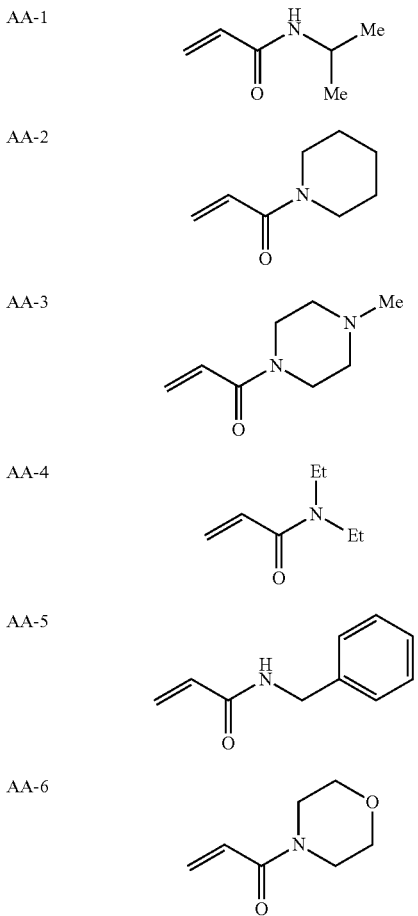

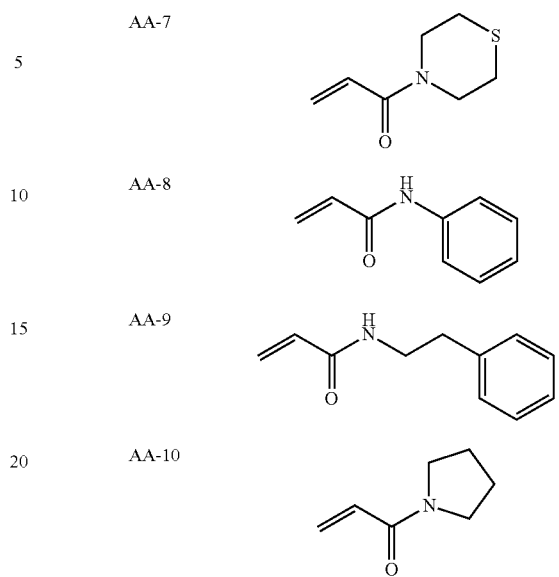

In a preferred embodiment, the acryl amide is a cyclic acryl amide. In the most preferred embodiment of the UV curable inkjet ink, the acryl amide is acryloyl morpholine.

The above preferred UV curable inkjet ink includes at least 20.0 to 75.0 wt %, preferably at least 30.0 to 65.0 wt % and most preferably at least 40.0 to 55.0 wt % of a polyfunctional acrylate in the polymerizable composition, with all weight percentages (wt %) based on the total weight of the polymerizable composition.

A single polyfunctional acrylate or a mixture of polyfunctional acrylates may be used.

In a preferred embodiment, the polyfunctional acrylate is selected from the group consisting of dipropylene glycol diacrylate, neopentylglycol diacrylate, neopentylglycol (2× propoxylated) diacrylate, penta erythritol tetraacrylate, 1,6-hexanediol diacrylate, trimethylolpropane triacrylate, ethoxylated trimethylolpropane triacrylate, tripropylene glycol diacrylate, ditrimethyloylpropane tetraacrylate, ethoxylated pentaerythritol tetraacrylate, and polyethyleneglycol diacrylate.

In the most preferred embodiment of the UV curable inkjet ink, the polyfunctional acrylate includes a neopentylglycol hydroxy pivalate diacrylate.

The above preferred UV curable inkjet ink includes at least 1 to 15 wt %, preferably at least 2 to 12 wt % and most preferably at least 4 to 8 wt % of a (meth)acrylate containing a carboxylic acid group in the polymerizable composition, with all weight percentages (wt %) based on the total weight of the polymerizable composition.

Suitable examples of the carboxylic acid group-containing monofunctional (meth)acrylate include a compound represented by the Formula (I):

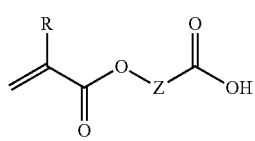

Formula (I),
wherein, R represents a hydrogen atom or a methyl group, preferably a hydrogen atom; and Z represents a divalent organic group.

Preferred examples of Z are *—(CH$_2$)n-* [wherein n represents an integer of 2 to 12]; *—CH$_2$—CH$_2$—O—CO—Z'—* [wherein Z' represents a divalent organic group selected from the following]; *—C$_6$H$_4$—*; *—C$_6$H$_4$—(CH$_2$)n-* [wherein n represents an integer of 1 to 12]; *—(CH$_2$)n-C$_6$H$_4$—* [wherein n represents an integer of 1 to 12]; and *—(CH$_2$)n-O—C$_6$H$_4$—* [wherein n represents an integer of 1 to 12]; and wherein * represents a linking site.

Preferred examples of the (meth)acrylate containing a carboxylic acid group are disclosed in Table 2.

TABLE 2

MC-1
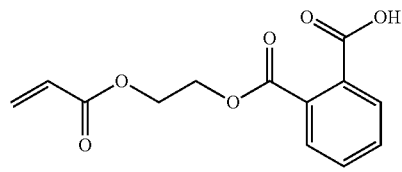 [SMILES: C=CC(=O)OCCOC(=O)c1ccccc1C(=O)O]

MC-2
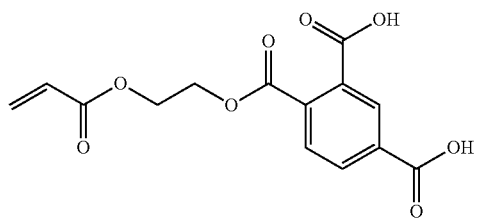 [SMILES: C=CC(=O)OCCOC(=O)c1ccc(C(=O)O)cc1C(=O)O]

MC-3
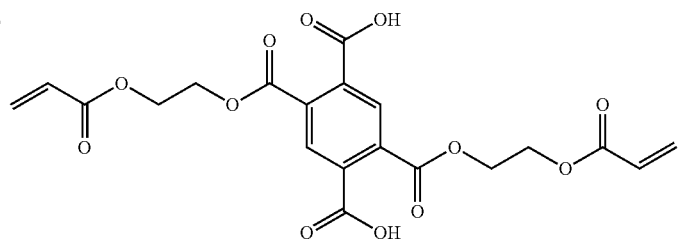 [SMILES: C=CC(=O)OCCOC(=O)c1cc(C(=O)O)c(C(=O)OCCOC(=O)C=C)cc1C(=O)O]

MC-4
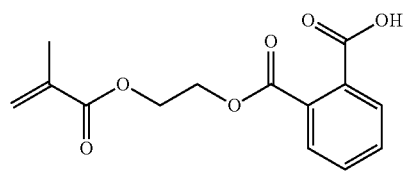 [SMILES: C=C(C)C(=O)OCCOC(=O)c1ccccc1C(=O)O]

In a particularly preferred embodiment of the UV curable inkjet ink, the (meth)acrylate containing a carboxylic acid group is selected from the group consisting of: 2-carboxyethyl acrylate and 2-acryloyl ethyl succinate. Most preferably the (meth)acrylate containing a carboxylic acid group is 2-carboxyethyl acrylate.

Solubilizable UV Curable Inkjet Inks

In a more preferred embodiment, the UV curable inkjet ink is solubilized by the stripping solution, meaning that no flakes have to be filtered of from the stripping solution like in the previous embodiment.

A preferred UV curable inkjet ink for this embodiment contains
a) one or more photoinitiators; b) optionally a colorant preferably decolorizing at a pH of more than 10; c) one or more hydrolyzable polyfunctional monomer or oligomer having at least one alkali hydrolyzable group located in the atomic chain between two polymerizable groups of the polyfunctional monomer or oligomer; and d) one or more water absorption controlling monomers being a monofunctional or difunctional monomer containing at least one functional group selected from the group consisting of a hydroxyl group, an ethylene oxide or oligo-ethylene oxide group, a tertiary amine group, an acidic group having a pK$_a$ not lower than 3 and a five to seven membered aromatic or non aromatic heterocyclic group.

The hydrolyzable polyfunctional monomers or oligomers are responsible for the degradation of the cured inkjet ink image in the stripping solution resulting in the cured inkjet ink image being completely dissolved in the stripping solution. However, in order to obtain acceptable manufacturing times, a second monomer needs to be included. The water absorption controlling monomers are responsible for the swelling of the cured ink image in the stripping solution. This accelerates the dissolving of the cured ink image by the alkali present in the stripping solution.

In a preferred embodiment, the at least one alkali hydrolyzable group located in the atomic chain between two polymerizable groups of the polyfunctional monomer or oligomer is selected from the group consisting of Formulas H-1 to H-4:

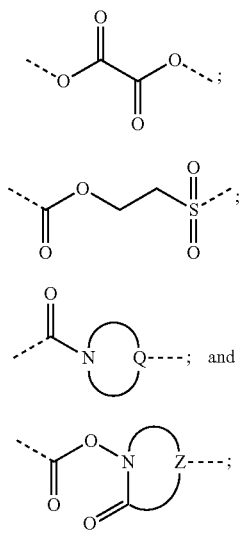

H-1

H-2

H-3

H-4 wherein
Q represents the necessary atoms to form a five membered aromatic ring group; Z represents the necessary atoms to form a five or six membered ring group; and the dashed lines represents the bonds to the rest of the polyfunctional monomer or oligomer.

In a further preferred embodiment, the at least one alkali hydrolyzable group H-3 is selected from the group consisting of an imidazole group, a benzimidazole group, a triazole group and a benzotriazole group.

In a further preferred embodiment, the at least one alkali hydrolyzable group H-4 is selected from the group consisting of an succinimid group and a phtalimid group.

In a particularly preferred embodiment, the at least one alkaline hydrolyzable group is an oxalate ester group.

The one or more hydrolyzable polyfunctional monomers or oligomers preferably contain polymerizable groups independently selected from the group consisting of an acrylate group, a methacrylate group, an acrylamide group, a methacrylamide group, a styrene group, a maleate group, a fumarate group, an itaconate group, a vinyl ether group, a vinyl ester group, an allyl ether group and an allyl ester group.

Typical examples of hydrolyzable polyfunctional monomers and oligomers having at least one alkali hydrolyzable group located in the atomic chain between two polymerizable groups of the polyfunctional monomers and oligomers are given in Table 3 without being limited thereto.

TABLE 3

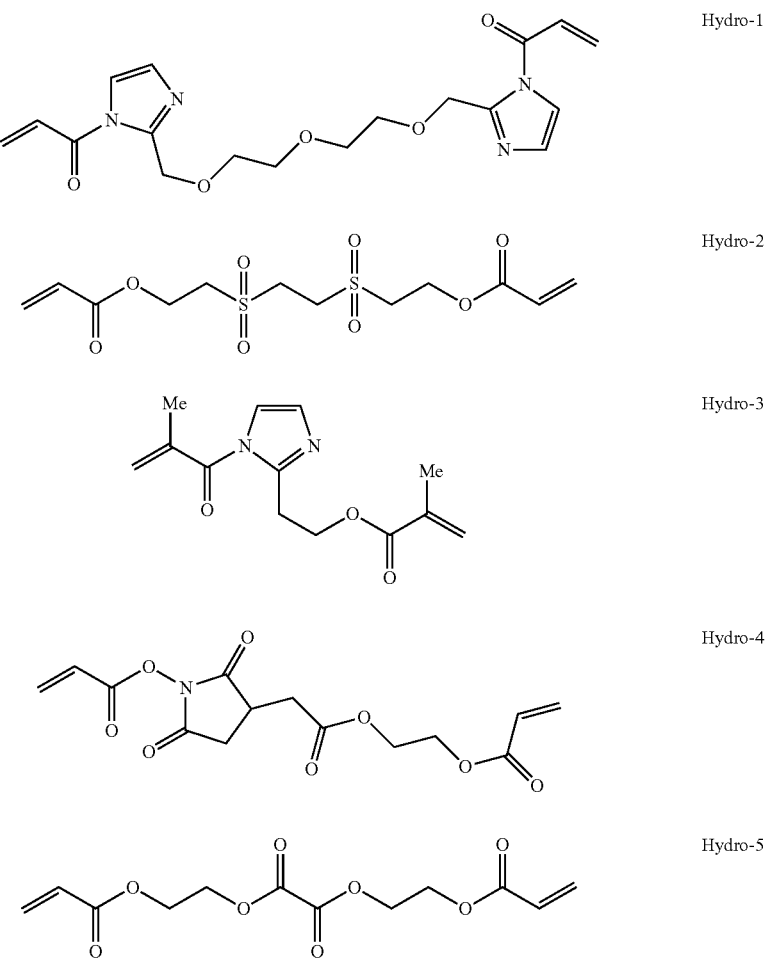

TABLE 3-continued

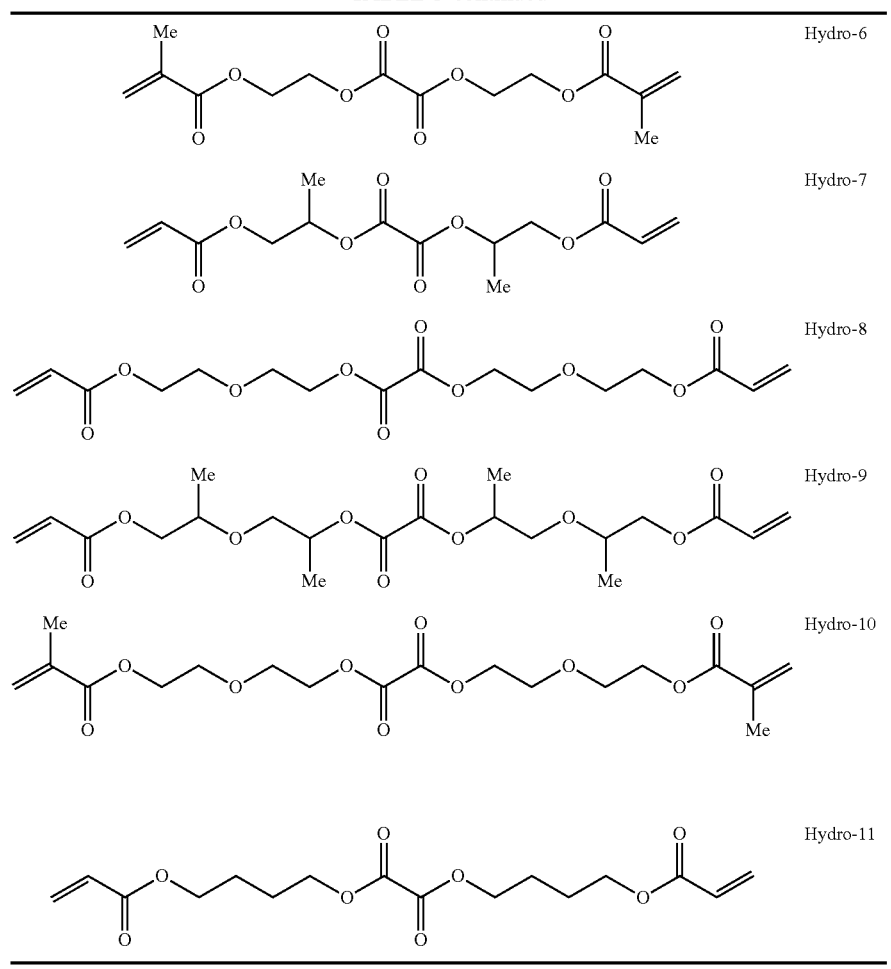

The one or more hydrolyzable polyfunctional monomers or oligomers having at least one alkali hydrolyzable group located in the atomic chain between two polymerizable groups of the polyfunctional monomer or oligomer is preferably present in the UV curable inkjet ink in an amount of at least 25 wt %, more preferably in an amount of at least 30 wt % based on the total weight of the UV curable inkjet ink.

The UV curable inkjet ink of the third embodiment contains one or more water absorption controlling monomers. A water absorption controlling monomer is a monofunctional or difunctional monomer containing at least one functional group selected from the group consisting of a hydroxyl group, an ethylene oxide or oligo-ethylene oxide group, a tertiary amine, an acidic function having a $pK_a$ not lower than 3 and a five to seven membered aromatic or non aromatic hetero-ring.

In a preferred embodiment, the one or more water absorption controlling monomers contain at least one functional group selected from the group consisting of a hydroxyl group an ethylene oxide or oligo-ethylene oxide group, a carboxylic acid group, a phenolic group, five to seven membered lactam group and a morpholino group.

In the most preferred embodiment, the one or more water absorption controlling monomers contain at least one functional group selected from the group consisting of an ethylene oxide or oligo-ethylene oxide group, a hydroxyl group and a morpholino group.

The water absorption controlling monomer is preferably a monofunctional monomer.

The one or more water absorption controlling monomers preferably include a polymerizable group selected from the group consisting of an acrylate group, a methacrylate group, a acrylamide group and a methacrylamide group, The one or more water absorption controlling monomers preferably include a polymerizable group selected from the group consisting of an acrylate group and an acrylamide group.

Suitable water absorption controlling monomers are given in Table 4, without being limited thereto.

TABLE 4

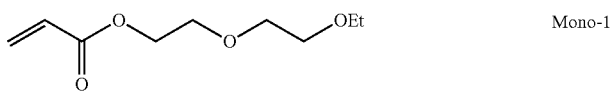

TABLE 4-continued
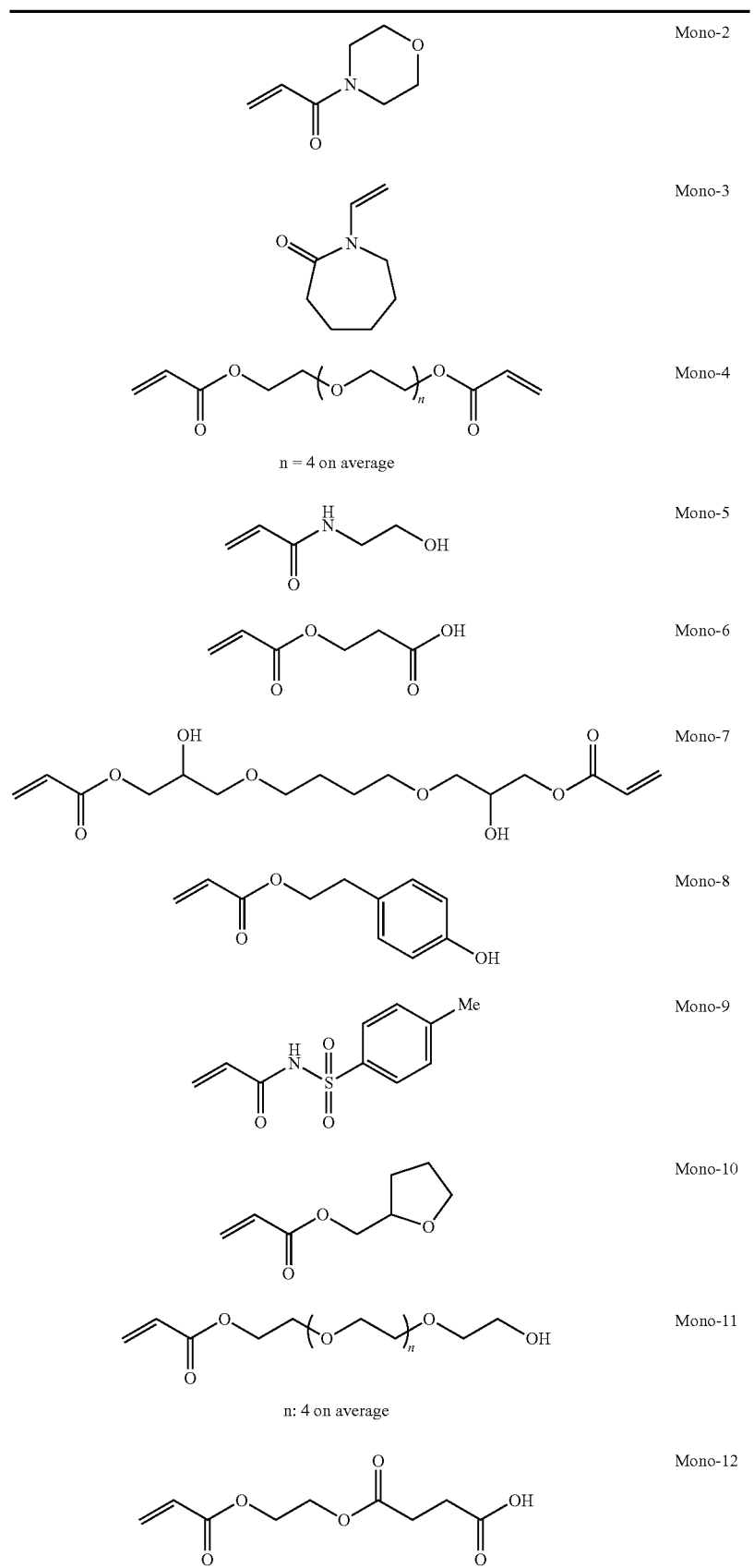

TABLE 4-continued

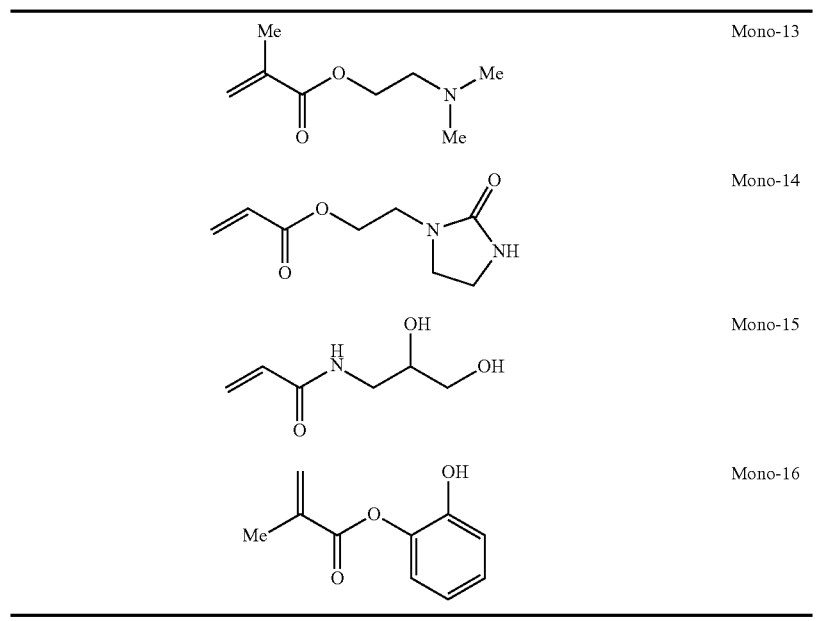

The one or more water absorption controlling monomers is preferably present in the UV curable inkjet ink in an amount of at least 20 wt % based on the total weight of the UV curable inkjet ink.

Other Polymerizable Compounds

For the first embodiment, where the UV curable inkjet ink is not stripped, there is no real limitation on the polymerizable composition as long as the inkjet ink is etch-resistant. It should be clear that an inkjet ink of the second and third embodiment may also be used in a non-stripping manufacturing process.

The strippable UV curable inkjet ink may contain other polymerizable compounds than the ones disclosed above. They may be present in the UV curable inkjet ink in an amount of 0 to 20 wt %, more preferably up to 15 wt % and most preferably in an amount of up to 10 wt % with all weight percentages (wt %) based on the total weight of the polymerizable composition.

The solubilizable UV curable inkjet ink may also contain one or more other monomers and oligomers next to the one or more hydrolyzable polyfunctional monomers and oligomers and the one or more water absorption controlling monomers, but preferably the UV curable inkjet ink consists of one or more hydrolyzable polyfunctional monomers and oligomers and one or more water absorption controlling monomers.

The solubilizable UV curable inkjet ink may contain one or more other monomers and oligomers, preferably present in the UV curable inkjet ink in an amount of no more than 25 wt %, more preferably no more than 15 wt % and most preferably in an amount of 0 to 10 wt % based on the total weight of the UV curable inkjet ink.

The other polymerizable compounds of the above described UV curable inkjet inks may be monomers and oligomers may possess different degrees of functionality, and a mixture including combinations of mono-, di-, tri- and higher functionality monomers, oligomers and/or prepolymers may be used. The viscosity of the UV curable inkjet ink can be adjusted by varying the ratio between the monomers and oligomers.

Particularly preferred other monomers and oligomers are those listed in [0106] to [0115] in EP 1911814 A (AGFA).

Colorants

The UV curable inkjet may be a substantially colourless inkjet ink, but preferably the UV curable inkjet ink includes at least one colorant. The colorant makes the temporary mask clearly visible to the manufacturer of metallic article, allowing a visual inspection of quality.

The colorant may be a pigment or a dye, but is preferably a dye that is not bleached by the UV curing step during the inkjet printing process of the UV curable inkjet ink. Generally dyes exhibit a higher light fading than pigments, but cause no problems on jettability. However, most preferably the colorant is a dye that survives the UV curing step in the inkjet printing process. A dye causes unlike pigments and dispersants usually no sludge in the etching and stripping solutions.

It was found that anthraquinone dyes exhibit only minor light fading under the normal UV curing conditions used in UV curable inkjet printing.

The pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley-VCH, 2004. ISBN 3527305769.

Suitable pigments are disclosed in paragraphs [0128] to [0138] of WO 2008/074548 (AGFA GRAPHICS).

Pigment particles in inkjet inks should be sufficiently small to permit free flow of the ink through the inkjet-printing device, especially at the ejecting nozzles. It is also desirable to use small particles for maximum colour strength and to slow down sedimentation. Most preferably, the average pigment particle size is no larger than 150 nm. The average particle size of pigment particles is preferably determined with a Brookhaven Instruments Particle Sizer BI90plus based upon the principle of dynamic light scattering.

In a particularly preferred embodiment, the colorant in the UV curable inkjet ink is an anthraquinone dye, such as Macrolex™ Blue 3R (CASRN 325781-98-4) from LANXESS.

Other preferred dyes include crystal violet and a copper phthalocyanine dye.

In a preferred embodiment, the colorant of the inkjet ink is a dye which decolorizes at a pH of more than 10.

In a preferred embodiment, the colorant is dissolved in the radiation curable inkjet ink, i.e. it is a dye. Compared to pigments, dyes allow much faster discolouration. They also do not cause problems of dispersion stability in the inkjet ink due to sedimentation.

In a first preferred embodiment the colorant is represented by the open form of a lactone based leuco dye. In a further preferred embodiment, the leuco dyes are leuco dyes according to Formula (I) to (VIII).

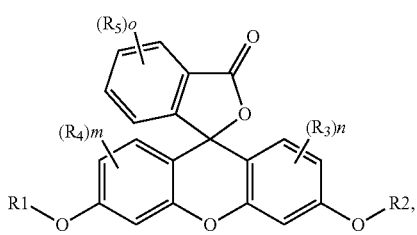

Formula (I)

wherein $R^1$ and $R^2$ are independently selected from the group consisting of a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group; n and m independently represent an integer from 0 to 3; $R^3$ and $R^4$ are independently selected from the group consisting of a substituted or unsubstituted alkyl group, an alkoxy group and a halogen; $R^5$ is selected from the group consisting of a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group, a halogen, an alkoxy group, an ester, an amide, an amine and a carboxylic acid; and o represents an integer from 0 to 4.

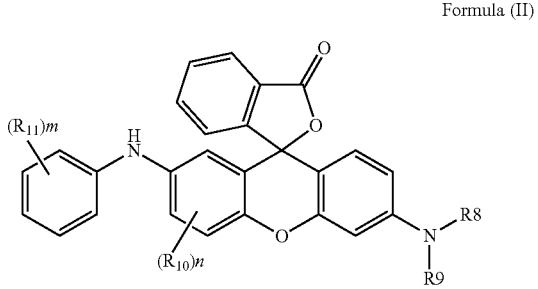

Formula (II)

wherein R8 and R9 are independently selected from the group consisting of a hydrogen, a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group; R10 and R11 are independently selected from a substituted or unsubstituted alkyl group, a substituted or unsubstituted alkenyl group and a substituted or unsubstituted alkynyl group; n represents an integer from 0 to 3; and m represents an integer from 0 to 5.

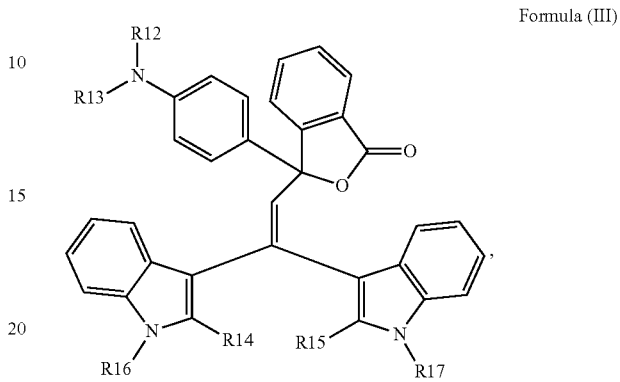

Formula (III)

wherein R12, R13, R16 and R17 are independently selected from the group consisting of a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group; R14 and R15 are independently selected from the group consisting of a hydrogen, a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group.

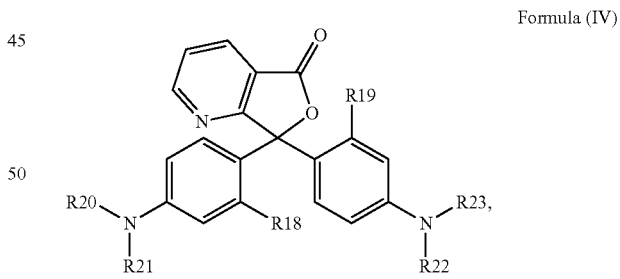

Formula (IV)

wherein R20 to R23 are independently selected from the group consisting of a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group; R18 and R19 are independently selected from the group consisting of a hydrogen, a substituted or unsubstituted alkyl group and an alkoxy group.

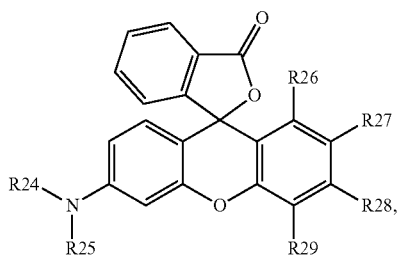

Formula (V)

wherein R24 and R25 are independently selected from the group consisting of a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group; R26 to R29 are independently selected from the group consisting of a hydrogen, a substituted or unsubstituted alkyl group and a group formed by two of the groups R26 to R29 forming a substituted or unsubstituted aromatic ring.

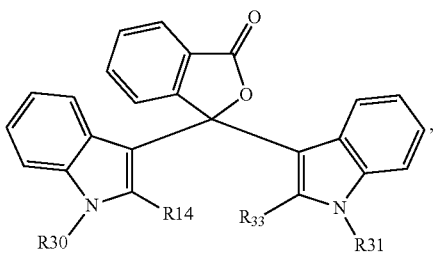

Formula (VII)

wherein R30 to R33 independently represent a group selected from the group consisting of a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group.

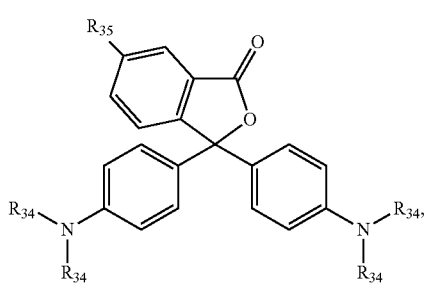

Formula (VIII)

wherein R34 is selected from the group consisting of a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group; R35 is selected from the group consisting of a hydrogen, an alkoxy group, a dialkylamino group, a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group.

Typical examples of lactone based leuco dyes are given in Table 5 without being limited thereto.

TABLE 5

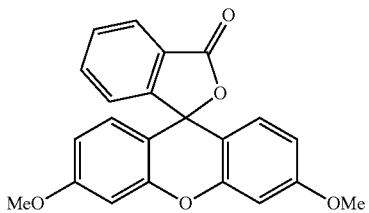 [SMILES: COc1ccc2c(c1)Oc1cc(OC)ccc1C21OC(=O)c2ccccc21]

Leuco-1

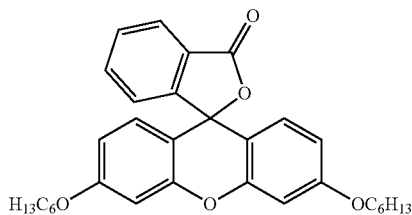

Leuco-2

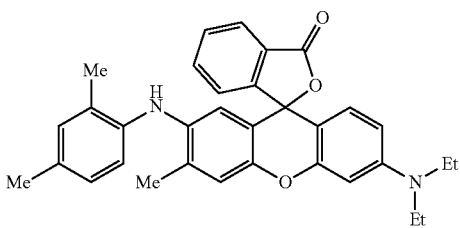 [SMILES: CCN(CC)c1ccc2c(c1)Oc1cc(C)c(Nc3ccc(C)cc3C)cc1C21OC(=O)c2ccccc21]

Leuco-3

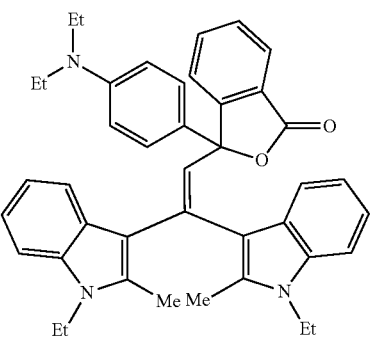 [SMILES: CCN(CC)c1ccc(C2(C=C(c3c(C)n(CC)c4ccccc34)c3c(C)n(CC)c4ccccc34)OC(=O)c3ccccc32)cc1]

Leuco-4

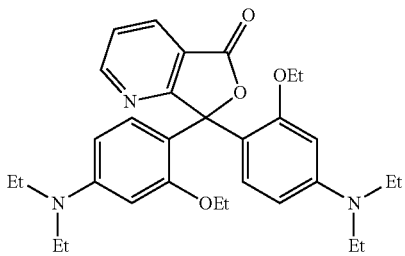 [SMILES: CCOc1cc(N(CC)CC)ccc1C1(c2ccc(N(CC)CC)cc2OCC)OC(=O)c2cccnc21]

Leuco-5

TABLE 5-continued

| | |
|---|---|
| 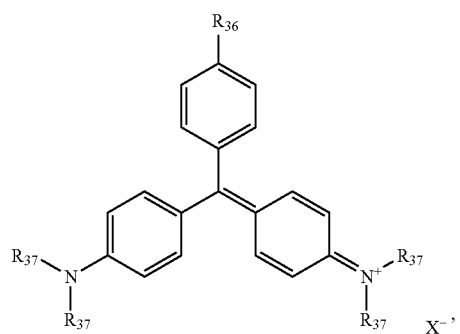 | Leuco-6 |
| | Leuco-7 |
| | Leuco-8 |
| | Leuco-9 |

In a second preferred embodiment, the colorant is represented by a triaryl methane dye, more preferably a triaryl methane dye according to Formula (IX).

Formula (IX)

wherein R36 is selected from the group consisting of a hydrogen, a dialkylamino group, diarylamino group, an alkylarylamino group, an alkoxy group, a halogen, a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group; R37 is selected from the group consisting of a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group; and X represents a counterion to compensate the positive charge.

In a third preferred embodiment, the colorant is represented by a cyanine dye, a merocyanine dye and an oxonol dye. Cyanine dyes according to general formula (X) to (XIII) are particularly preferred.

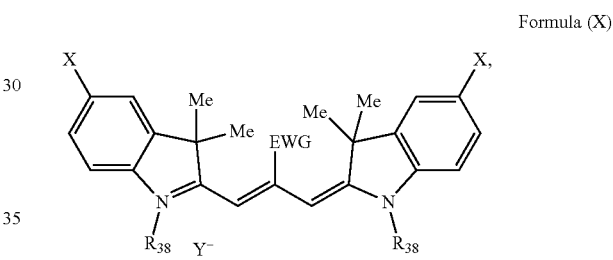

Formula (X)

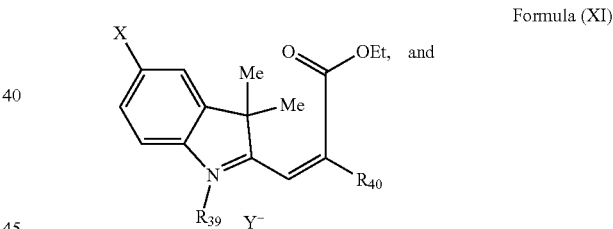

Formula (XI)

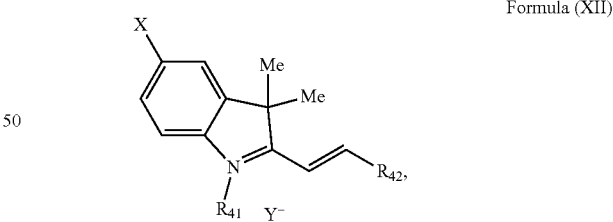

Formula (XII)

wherein X represents an group selected from a hydrogen, a nitrile, a nitro, a halogen and a sulfone; EWG represent an electron withdrawing group, preferably an ester group; R38, R39 and R41 independently represent a substituted or unsubstituted alkyl group; R40 and R42 are independently selected from the group consisting of a substituted or unsubstituted aryl group and a substituted or unsubstituted heteroaryl group; and Y represents a counterion to compensate the positive charge.

Other preferred colorants are represented by Formula (XIII) and (XIV):

Typical colorants according to Formula (IX) to (XIV) are given in Table 6 without being limited thereto.

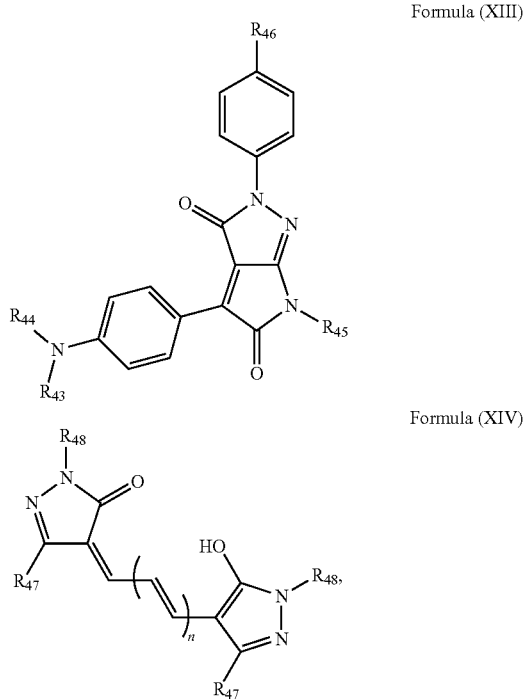

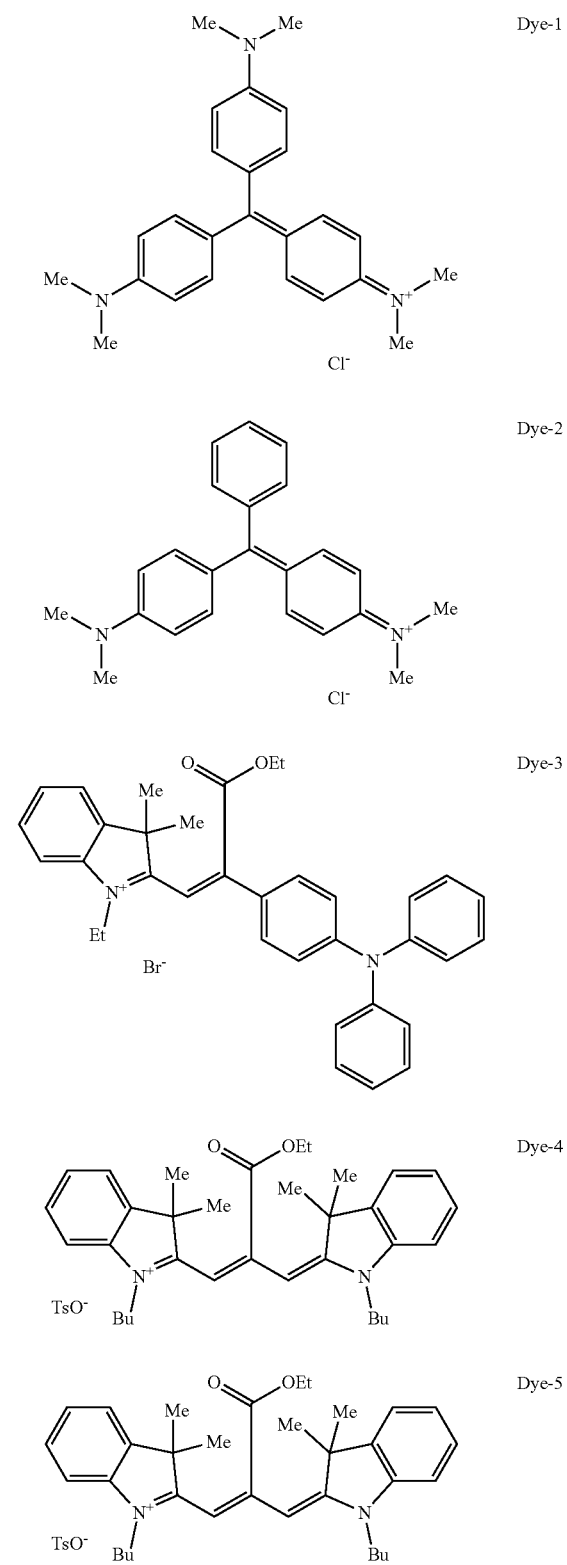

wherein R43, R44 and R45 are independently selected from the group consisting of a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group; R46 is selected from the group consisting of a hydrogen, an alkoxy group, a halogen, a carboxy group or an ester thereof, a sulfonic acid or salt thereof, a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group; R47 is selected from the group consisting of a hydrogen, a substituted or unsubstituted alkyl group, a substituted or unsubstituted alkenyl group, a substituted or unsubstituted alkynyl group, a substituted or unsubstituted alkaryl group, a substituted or unsubstituted aralkyl group, a substituted or unsubstituted aryl or heteroaryl group, an amino group, an amide group and a sulphonamide group; R48 is selected from the group consisting of a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group.

In a particularly preferred embodiment, the colorant comprises at least on substituent, capable of compatibilizing the colorant or its decolorized form with an aqueous stripping solution. This substituent capable of compatibilizing said colorant or its decolorized form is preferably selected from the group consisting of a carboxylic acid or salt thereof, a sulfonic acid or salt thereof, a phosphonic acid or salt thereof, a half ester of sulphuric acid or salt thereof, a mono- or diester of phosphoric acid or salt thereof, a phenolic group, an ethylene oxide group and a hydroxyl group, a carboxylic acid, a hydroxyl group and an ethylene oxide group being particularly preferred.

TABLE 6-continued

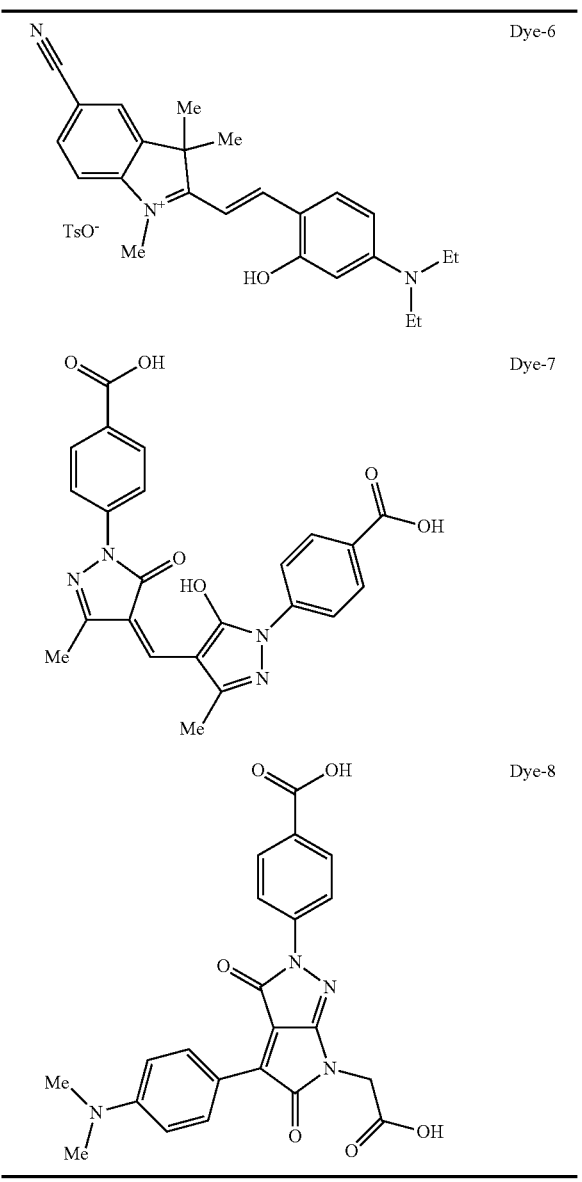

The colorant is present in the UV curable inkjet ink in an amount sufficient to impair visible colour to the cured ink pattern. In a preferred embodiment, the colorant is present in an amount of 0.1 to 6.0 wt %. For a dye, usually an amount of less than 2 wt %, more preferably less than 1 wt % based on the total weight of the UV curable inkjet ink suffices.

Polymeric Dispersants

If the UV curable inkjet ink contains a colour pigment, then the UV curable inkjet ink preferably contains a dispersant, more preferably a polymeric dispersant, for dispersing the pigment.

Suitable polymeric dispersants are copolymers of two monomers but they may contain three, four, five or even more monomers. The properties of polymeric dispersants depend on both the nature of the monomers and their distribution in the polymer. Copolymeric dispersants preferably have the following polymer compositions:

statistically polymerized monomers (e.g. monomers A and B polymerized into ABBAABAB);

alternating polymerized monomers (e.g. monomers A and B polymerized into ABABABAB);

gradient (tapered) polymerized monomers (e.g. monomers A and B polymerized into AAABAABBABBB);

block copolymers (e.g. monomers A and B polymerized into AAAAABBBBBB) wherein the block length of each of the blocks (2, 3, 4, 5 or even more) is important for the dispersion capability of the polymeric dispersant;

graft copolymers (graft copolymers consist of a polymeric backbone with polymeric side chains attached to the backbone); and mixed forms of these polymers, e.g. blocky gradient copolymers.

Suitable polymeric dispersants are listed in the section on "Dispersants", more specifically [0064] to [0070] and [0074] to [0077], in EP 1911814 A (AGFA).

Commercial examples of polymeric dispersants are the following:

DISPERBYK™ dispersants available from BYK CHEMIE GMBH;
SOLSPERSE™ dispersants available from NOVEON;
TEGO™ DISPERS™ dispersants from EVONIK;
EDAPLAN™ dispersants from MÜNZING CHEMIE;
ETHACRYL™ dispersants from LYONDELL;
GANEX™ dispersants from ISP;
DISPEX™ and EFKA™ dispersants from CIBA SPECIALTY CHEMICALS INC;
DISPONER™ dispersants from DEUCHEM; and
JONCRYL™ dispersants from JOHNSON POLYMER.

Photoinitiators and Photoinitiating Systems

The UV curable inkjet ink contains at least one photoinitiator, but may contain a photoinitiating system including a plurality of photoinitiators and/or co-initiators.

The photoinitiator in the UV curable inkjet ink is preferably a free radical initiator, more specifically a Norrish type I initiator or a Norrish type II initiator. A free radical photoinitiator is a chemical compound that initiates polymerization of monomers and oligomers when exposed to actinic radiation by the formation of a free radical. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in the present invention, alone or in combination.

Suitable photoinitiators are disclosed in CRIVELLO, J. V., et al. Photoinitiators for Free Radical Cationic and Anionic Photopolymerization. 2nd edition. Edited by BRADLEY, G. London, UK: John Wiley and Sons Ltd, 1998. p. 287-294.

Specific examples of photoinitiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzyl dimethylketal, bis(2,6-dimethylbenzoyl)-2,4,4-trimethylpentylphosphine oxide, 2,4,6-trimethylbenzoyldiphenylphosphine oxide, 2,4,6-trimethoxybenzoyldiphenylphosphine oxide, 2-methyl-1-[4-(methylthio) phenyl]-2-morpholinopropan-1-one, 2,2-dimethoxy-1, 2-diphenylethan-1-one or 5,7-diiodo-3-butoxy-6-fluorone.

Suitable commercial photoinitiators include Irgacure™ 184, Irgacure™ 500, Irgacure™ 369, Irgacure™ 1700, Irgacure™ 651, Irgacure™ 819, Irgacure™ 1000, Irgacure™

1300, Irgacure™ 1870, Darocur™ 1173, Darocur™ 2959, Darocur™ 4265 and Darocur™ ITX available from CIBA SPECIALTY CHEMICALS, Lucerin™ TPO available from BASF AG, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

The photoinitiator is preferably a so-called diffusion hindered photoinitiator. A diffusion hindered photoinitiator is a photoinitiator which exhibits a much lower mobility in a cured ink layer than a monofunctional photoinitiator, such as benzophenone. Several methods can be used to lower the mobility of the photoinitiator. One way is to increase the molecular weight of the photoinitiators so that the diffusion speed is reduced, e.g. polymeric photoinitiators. Another way is to increase its reactivity so that it is built into the polymerizing network, e.g. multifunctional photoinitiators (having 2, 3 or more photoinitiating groups) and polymerizable photoinitiators.

The diffusion hindered photoinitiator for the UV curable inkjet ink is preferably selected from the group consisting of non-polymeric multifunctional photoinitiators, oligomeric or polymeric photoinitiators and polymerizable photoinitiators. Most preferably the diffusion hindered photoinitiator is a polymerizable initiator or a polymeric photoinitiator.

A preferred diffusion hindered photoinitiator contains one or more photoinitiating functional groups derived from a Norrish type I-photoinitiator selected from the group consisting of benzoinethers, benzil ketals, α,α-dialkoxyacetophenones, α-hydroxyalkylphenones, α-aminoalkylphenones, acylphosphine oxides, acylphosphine sulphides, α-haloketones, α-halosulfones and phenylglyoxalates.

A preferred diffusion hindered photoinitiator contains one or more photoinitiating functional groups derived from a Norrish type II-initiator selected from the group consisting of benzophenones, thioxanthones, 1,2-diketones and anthraquinones.

Suitable diffusion hindered photoinitiators are also those disclosed in EP 2065362 A (AGFA) in paragraphs [0074] and [0075] for difunctional and multifunctional photoinitiators, in paragraphs [0077] to [0080] for polymeric photoinitiators and in paragraphs [0081] to [0083] for polymerizable photoinitiators.

A preferred amount of photoinitiator is 0.1-20 wt %, more preferably 2-15 wt %, and most preferably 3-10 wt % of the total weight of the UV curable inkjet ink.

In order to increase the photosensitivity further, the UV curable inkjet ink may additionally contain co-initiators. Suitable examples of co-initiators can be categorized in three groups: 1) tertiary aliphatic amines such as methyldiethanolamine, dimethylethanolamine, triethanolamine, triethylamine and N-methylmorpholine; (2) aromatic amines such as amylparadimethylaminobenzoate, 2-n-butoxyethyl-4-(dimethylamino)benzoate, 2-(dimethylamino)ethylbenzoate, ethyl-4-(dimethylamino)benzoate, and 2-ethylhexyl-4-(dimethylamino)benzoate; and (3) (meth)acrylated amines such as dialkylamino alkyl(meth)acrylates (e.g., diethylaminoethylacrylate) or N-morpholinoalkyl-(meth)acrylates (e.g., N-morpholinoethyl-acrylate). The preferred co-initiators are aminobenzoates.

When one or more co-initiators are included into the UV curable inkjet ink, preferably these co-initiators are diffusion hindered.

A diffusion hindered co-initiator is preferably selected from the group consisting of non-polymeric di- or multifunctional co-initiators, oligomeric or polymeric co-initiators and polymerizable co-initiators. More preferably the diffusion hindered co-initiator is selected from the group consisting of polymeric co-initiators and polymerizable co-initiators. Most preferably the diffusion hindered co-initiator is a polymerizable co-initiator having at least one (meth) acrylate group, more preferably having at least one acrylate group.

The UV curable inkjet ink preferably includes a polymerizable or polymeric tertiary amine co-initiator.

Preferred diffusion hindered co-initiators are the polymerizable co-initiators disclosed in EP 2053101 A (AGFA) in paragraphs [0088] and [0097].

The UV curable inkjet inks preferably includes the (diffusion hindered) co-initiator in an amount of 0.1 to 20 wt %, more preferably in an amount of 0.5 to 15 wt %, most preferably in an amount of 1 to 10 wt % of the total weight of the UV curable inkjet ink.

Polymerization Inhibitors

The UV curable inkjet ink may contain at least one inhibitor for improving the thermal stability of the ink.

Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol, 2,6-di-tert.butyl-4-methylphenol (=BHT) may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from Cytec Surface Specialties.

The inhibitor is preferably a polymerizable inhibitor.

Since excessive addition of these polymerization inhibitors may lower the curing speed, it is preferred that the amount capable of preventing polymerization is determined prior to blending. The amount of a polymerization inhibitor is preferably lower than 5 wt %, more preferably lower than 3 wt % of the total UV curable inkjet ink.

Surfactants

The UV curable inkjet ink may contain at least one surfactant, but preferably no surfactant is present. If no surfactant is present, the UV curable inkjet ink does not spread well on the metal surface allowing the generation of thin lines.

The surfactant can be anionic, cationic, non-ionic, or zwitter-ionic and is usually added in a total quantity less than 1 wt % based on the total weight of the UV curable inkjet ink.

Suitable surfactants include fluorinated surfactants, fatty acid salts, ester salts of a higher alcohol, alkylbenzene sulfonate salts, sulfosuccinate ester salts and phosphate ester salts of a higher alcohol (for example, sodium dodecylbenzenesulfonate and sodium dioctylsulfosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants are selected from fluoric surfactants (such as fluorinated hydrocarbons) and silicone surfactants. The silicone surfactants are preferably siloxanes and can be alkoxylated, polyether modified, polyether modified hydroxy functional, amine modified, epoxy modified and other modifications or combinations thereof. Preferred siloxanes are polymeric, for example polydimethylsiloxanes.

Preferred commercial silicone surfactants include BYK™ 333 and BYK™ UV3510 from BYK Chemie.

In a preferred embodiment, the surfactant is a polymerizable compound.

Preferred polymerizable silicone surfactants include a (meth)acrylated silicone surfactant. Most preferably the (meth)acrylated silicone surfactant is an acrylated silicone surfactant, because acrylates are more reactive than methacrylates.

In a preferred embodiment, the (meth)acrylated silicone surfactant is a polyether modified (meth)acrylated polydimethylsiloxane or a polyester modified (meth)acrylated polydimethylsiloxane.

Preferably the surfactant is present in the UV curable inkjet ink in an amount of 0 to 0.05 wt % based on the total weight of the UV curable inkjet ink.

Inkjet Printing Devices

The UV curable inkjet ink may be jetted by one or more print heads ejecting small droplets in a controlled manner through nozzles onto a substrate, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the inkjet printing method according to the present invention is not restricted to piezoelectric inkjet printing. Other inkjet print heads can be used and include various types, such as a continuous type.

The inkjet print head normally scans back and forth in a transversal direction across the moving ink-receiver surface. Often the inkjet print head does not print on the way back. Bi-directional printing is preferred for obtaining a high areal throughput. Another preferred printing method is by a "single pass printing process", which can be performed by using page wide inkjet print heads or multiple staggered inkjet print heads which cover the entire width of the metal plate. In a single pass printing process the inkjet print heads usually remain stationary and the metal substrate is transported under the inkjet print heads.

For metallic substrates which are not essentially two dimensional like a metal plate, i.e. having a three dimensional shape like a sphere or more complex objects like a combination of a cylinder with a cube, the print head may be mounted on a robotic arm which is able to follow the shape of the three dimensional object to apply the UV curable inkjet ink. Such technology is known in the art, e.g. US 2015042716 (HEIDELBERGER DRUCKMASCHINEN AG), WO 2014/001850 (PROJECTA ENGINEERING) and US 2015009254 (LAC CORP).

A preferred method of manufacturing metallic articles (5) from a metal substrate (1) includes the steps of:
a) jetting an image with a UV curable inkjet ink on at least one surface of the metallic substrate using a print head mounted on a robotic arm;
b) UV curing the image (2);
c) electroplating or acidic etching the at least one metallic surface not covered by the UV cured image; and
d) stripping or solubilising the UV cured image by an aqueous alkaline solution.

Here below in Example 4, an image is inkjet printed on one side of a metallic plate while the opposite side of the metallic plate is fully coated with the UV curable inkjet ink.

In a preferred embodiment of the method of manufacturing metallic articles, an image is inkjet printed on both sides of the metal plate so that the manufacturing speed is increased since the etching can now occur from both sides at the same time. For accomplishing the in register inkjet printing of the images on both sides of a metal plate, preferably the metal plate is immobilized and inkjet printed by one or more inkjet print heads mounted in a moving gantry. Such a printer equipped with a moving gantry carrying the scanning print heads is known in the art. An example is the Jeti Mira™ flatbed printer having a moving gantry for printing on x- and y-axes with high precision (see http://www.agfagraphics.com/global/en/product-finder/jeti-mira.html).

A preferred method of manufacturing metallic articles (5) from a metal substrate (1) includes the steps of:
a) UV inkjet printing an image with a UV curable inkjet ink on a first surface of the metallic substrate using one or more print heads mounted on a gantry wherein the one or more print heads scan back and forth in a transversal direction across the immobilized first surface and the gantry moves in a direction perpendicular to the transversal direction;
b) positioning the metallic substrate so that the second surface which is the opposite surface of the first surface opposite side can be inkjet printed;
c) UV inkjet printing an image with a UV curable inkjet ink on a second surface of the metallic substrate using the one or more print heads mounted on the gantry wherein the one or more print heads scan back and forth in a transversal direction across the immobilized second surface and the gantry moves in a direction perpendicular to the transversal direction;
c) electroplating or acidic etching the metallic surface not covered by the UV cured image; and
d) stripping or solubilising the UV cured image by an aqueous alkaline solution.

Curing Devices

The UV curable inkjet ink can be cured by exposing them to actinic radiation, such as electron beam or ultraviolet radiation, preferably the image of UV curable inkjet ink is cured by ultraviolet radiation, more preferably using UV LED curing.

In inkjet printing, the curing means may be arranged in combination with the print head of the inkjet printer, travelling therewith so that the curable liquid is exposed to curing radiation very shortly after been jetted.

In such an arrangement, with the exception of UV LEDs, it can be difficult to provide a small enough radiation source connected to and travelling with the print head. Therefore, a static fixed radiation source may be employed, e.g. a source of curing UV-light, connected to the radiation source by means of flexible radiation conductive means such as a fibre optic bundle or an internally reflective flexible tube.

Alternatively, the actinic radiation may be supplied from a fixed source to the radiation head by an arrangement of mirrors including a mirror upon the radiation head.

The source of radiation may also be an elongated radiation source extending transversely across the substrate to be cured. It may be adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:
UV-A: 400 nm to 320 nm
UV-B: 320 nm to 290 nm
UV-C: 290 nm to 100 nm.

In a preferred embodiment, the UV curable inkjet ink is cured by UV LEDs. The inkjet printing device preferably contains one or more UV LEDs preferably with a wavelength larger than 360 nm, preferably one or more UV LEDs with a wavelength larger than 380 nm, and most preferably UV LEDs with a wavelength of about 395 nm.

Furthermore, it is possible to cure the ink image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

For facilitating curing, the inkjet printing device often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

EXAMPLE

Materials

All materials used in the following examples were readily available from standard sources such as ALDRICH CHEMICAL Co. (Belgium) and ACROS (Belgium) unless otherwise specified. The water used was deionized water.

SR606A is neopentylglycol hydroxypivalate diacrylate available as Sartomer™ SR606A from ARKEMA.

ACMO is acryloyl morpholine available from RAHN.

CEA is 2-carboxyethyl acrylate from ALDRICH.

CN146 is a polyester acrylate oligomer available as Sartomer™ CN146 from ARKEMA.

CN823 is an acrylic oligomer alavailable as Sartomer™ CN823 from ARKEMA.

INHIB is a mixture forming a polymerization inhibitor having a composition:

TABLE 7

| Component | wt % |
|---|---|
| DPGDA | 82.4 |
| p-methoxyphenol | 4.0 |
| 2,6-di-tert-butyl-4-methylphenol | 10.0 |
| Cupferron ™ AL | 3.6 |

Cupferron™ AL is aluminum N-nitrosophenylhydroxylamine from WAKO CHEMICALS LTD.

Dye-1 is a blue anthraquinone dye available as Macrolex™ Blue 3R from LANXESS.

Crystal violet is a triarylmethane dye from ALDRICH.

ITX is an isomeric mixture of 2- and 4-isopropylthioxanthone available as Darocur™ ITX from BASF.

EPD is ethyl 4-dimethylaminobenzoate available as Genocure™ EPD from RAHN.

TPO is 2,4,6-trimethylbenzoyl-diphenyl-phosphineoxide, a photoinitiator available as Darocur™ TPO from BASF.

IC907 is 2-methyl-1-[4-(methylthio)phenyl]-2-morpholino-propan-1-one, a photoinitiator available as Irgacure™ 907 from BASF.

IC819 is bis(2,4,6-trimethylbenzoyl)-phenylphosphineoxide, a photoinitiator available as Irgacure™ 819 from BASF.

VEEA or 2-(2-vinyloxy-ethoxy)-ethyl acrylate was supplied by Nippon Shokubai.

4-hydroxybutyl acrylate was supplied by Nippon Kasei.

PETA is pentaerythritol tetraacylate available as SR295 from SARTOMER.

PEG200DA is polyethylene glycol (MW200) diacrylate available as Sartomer™ SR259 from SARTOMER having n=4:

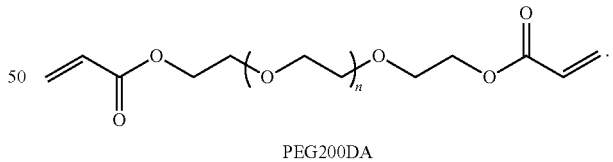

PEG200DA

HDDA is 1,6-hexanediol diacrylate available as Sartomer™ SR238 from SARTOMER:

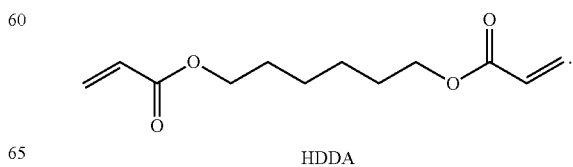

HDDA

HYDRO-8 is an oxalate monomer similar to PEG200DA:

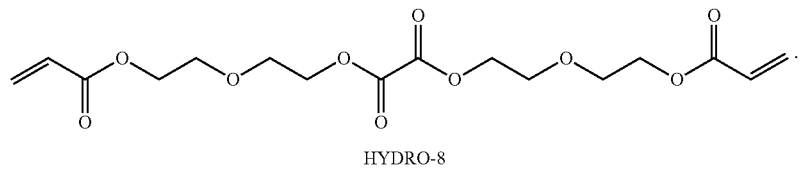 [SMILES: C=CC(=O)OCCOCCOC(=O)C(=O)OCCOCCOC(=O)C=C]

HYDRO-8

The synthesis of oxalic acid bis-[2-(2-acryloyloxy-ethoxy)-ethyl]ester (HYDRO-8) was performed as follows.

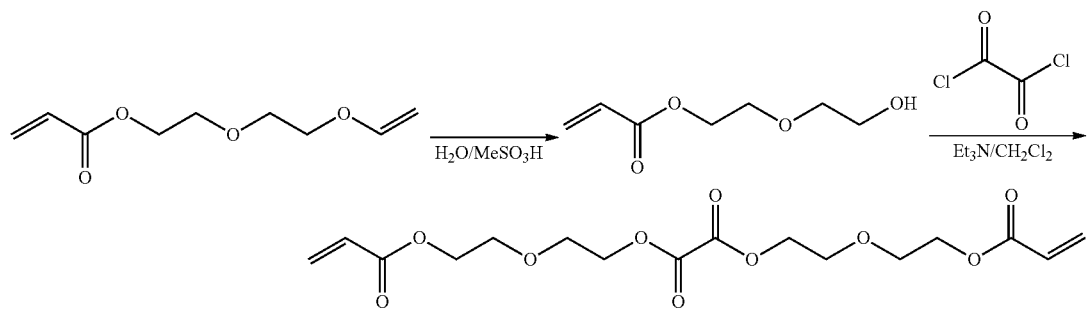

First Step: Synthesis of 2-(2-hydroxy-ethoxy)-ethyl Acrylate 55.9 g (0.3 mol) 2-(2-vinyloxy-ethoxy)-ethyl acrylate was dissolved in 100 ml acetone. 27 g (1.5 mol) water and 0.6 g (6 mmol) methane sulfonic acid was added. The reaction was allowed to continue for 4 hours at room temperature. The reaction mixture was diluted with 500 ml methylene chloride and extracted with 250 ml water. The organic fraction was dried over $MgSO_4$ and evaporated under reduced pressure. 2-(2-hydroxy-ethoxy)-ethyl acrylate was analyzed using TLC-chromatography (Partisil KC18F, supplied by Whatman, eluent: methanol/0.5 N NaCl 80/20, $R_f$: 0.83, only traces of (2-vinyloxy-ethoxy)-ethyl acrylate, $R_f$: 0.66 and a compound according to the following structure, $R_f$: 0.9).

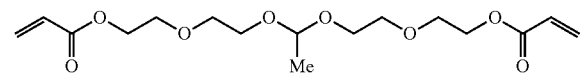 [SMILES: C=CC(=O)OCCOCCOC(C)OCCOCCOC(=O)C=C]

2-(2-hydroxy-ethoxy)-ethyl acrylate was used without further purification.

Second Step: Synthesis of Oxalic Acid bis-[2-(2-acryloyloxy-ethoxy)-ethyl]ester 30.4 g (0.19 mol) of 2-(2-hydroxy-ethoxy)-ethyl acrylate, 19.8 g (0.196 mol) triethyl amine and 1.3 g (5.7 mmol) BHT were dissolved in 140 ml methylene chloride. The solution was cooled to −10° C. A solution of 12.1 g (0.095 mol) oxalyl chloride in 70 ml methylene chloride was added drop wise, while maintaining the temperature at −10° C. The reaction was allowed to continue for 1 hour at 0° C., followed by reaction at room temperature for 16 hours. The reaction mixture was added to 200 g ice and the mixture was extracted with 200 ml methylene chloride. The organic fraction was extracted with 200 ml of a 1N hydrochloric acid solution, 200 ml of a saturated $NaHCO_3$ solution and 200 ml of brine. The organic fraction was dried over $MgSO_4$ and evaporated under reduced pressure. The crude product was purified, using preparative column chromatography using a Prochrom LC80 column, packed with packed with Kromasil Si 60 å 10 μm and methylene chloride/ethyl acetate 90/10 as eluent. 19.1 g of oxalic acid bis-[2-(2-acryloyloxy-ethoxy)-ethyl]ester was isolated (y: 54%). The compound was analyzed using TLC-chromatography (TLC Silica gel 60 $F_{254}$, supplied by Merck, eluent: methylene chloride/ethyl acetate, 83/17, $R_f$: 0.42) and LC-MS, according to the method described below (retention time: 6.6 min, purity 96.2 area %).

HYDRO-11 is an oxalate monomer similar to HDDA:

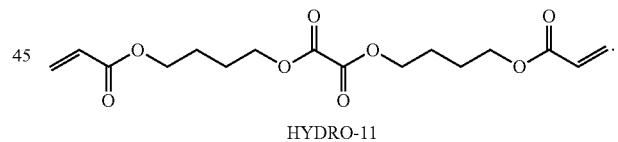

HYDRO-11

The synthesis of oxalic acid bis-(4-acryloyloxy-butyl)ester (HYDRO-11) was performed as follows.

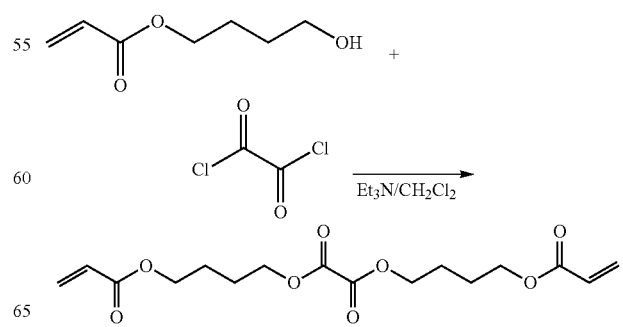

51.3 g (0.3 mol) 4-hydroxy-butyl acrylate, 31.4 g (0.31 mol) triethyl amine and 2 g (9 mmol) BHT were dissolved in 200 ml methylene chloride. The reaction mixture was cooled to −10° C. A solution of 19.0 g (0.15 mol) oxalyl chloride in 100 ml methylene chloride was added drop wise while maintaining the temperature at −10° C. The reaction was allowed to continue for 1 hour at 0° C., followed by reaction at room temperature for 16 hours. The reaction mixture was poured into 500 g ice and the mixture stirred for 1 hour. The mixture was extracted twice with 200 ml methylene chloride. The pooled organic fractions were extracted with 300 ml of a 1 N hydrochloric acid solution, 300 ml of a saturated $NaHCO_3$ solution and twice with 200 ml of brine. The organic fraction was dried over $MgSO_4$ and evaporated under reduced pressure. The crude product was purified, using preparative column chromatography using a Prochrom LC80 column, packed with packed with Kromasil Si 60 å 10 μm and methylene chloride/ethyl acetate 90/10 as eluent. 22 g of oxalic acid bis-(4-acryloyloxy-butyl)ester was isolated (y: 43%). The compound was analyzed, using TLC chromatography (TLC Silica gel 60 $F_{254}$, supplied by Merck, eluent: methylene chloride/ethyl acetate 96/4, $R_f$: 0.3), GC (retention time: 12.2 min, purity: 99.6 area %), and GC-MS, both according to the method described below.

DPGDA is dipropylene glycol diacrylate available as Sartomer™ SR508 from SARTOMER.

MADAME is N,N-dimethyl 2-aminoethyl methacrylate available as Norsocryl™ MADAME from ARKEMA France.

ACMO is acryloyl morpholine available from RAHN.

VEEA or 2-(2-vinyloxy-ethoxy)-ethyl acrylate was supplied by Nippon Shokubai.

IDA is isodecylacrylate available as Sartomer™ SR395 from SARTOMER.

TMPTA is trimethylolpropane triacrylate available as Sartomer™ SR350 from SARTOMER.

NPGDA is neopentylglycol (2× propoxylated) diacrylate available as Sartomer™ SR9003 from SARTOMER.

PETA is penta erythritol tetraacrylate available as Sartomer 295 from Sartomer.

CEA is 2-carboxyethyl acrylate from ALDRICH.

SUC is mono-2-(acryloxy)ethyl succinate from ALDRICH.

Measurement Methods
1. GC Analysis

The GC analysis was done on an Agilent 6890, using a DB1 column (30×0.25 0.25), helium as carrier gas at a flow rate of 2 ml/min and a split ratio of 50 to 1. A temperature profile was used, starting at 40° C. for 2 minutes and a temperature increase of 15° C. per minute up to a temperature of 200° C. 1 μl of a 1 w/w % solution of each compound in methylene chloride was injected.

2. GC-MS Analysis

The GC-MS analysis was done on a Trace Ultra-DSQ, using a DB-xlb column (30×0.25 0.25), helium as carrier gas at a flow rate of 1.2 ml/min and a split ratio of 50 to 1. A temperature profile was used starting at 80° C. and a temperature increase of 15° C. per minute up to 325° C. EI an $PCI_{(ammonia)}$ was used for recording the mass spectra. 1 μl of a 1 w/w % solution of each compound in methylene chloride was injected.

3. LC-MS Analysis

The LC-MS analysis was done on a Bruker HG Ultra, using an Altima HP C18 AQ column (150×3, 5 μm), operating at a flow rate of 0.35 ml/min and at 40° C. A gradient elution was used, with water as eluent A and acetonitrile as eluent B. The gradient according to Table 8 was used.

TABLE 8

| Time | % B |
|------|-----|
| 0    | 45  |
| 6    | 45  |
| 11   | 100 |
| 30   | 100 |
| 31   | 45  |
| 38   | 45  |

ESI ionisation was used in combination with a combibron detector. 5 μl of a solution of 2 mg of each compound in 20 ml acetonitrile was injected.

4. Flow Injection-MS

The flow injection analysis was done on a Bruker HG Ultra, using a mixture of 95% acetonitrile and 5% of 2 mmol ammonium acetate solution in water as eluent at a flow rate of 0.1 ml/min and a temperature of 40° C. ESI negative was used as ionisation. 2 μl of a solution of 2 mg of each compound in 20 ml acetonitrile was injected.

5. Etch Resistance (ER %)

The etch resistance was evaluated by the determining the percentage of the cured inkjet ink layer that remained on the metal substrate after etching. An etch resistance of 100% means that the whole cured inkjet ink layer survived the etching bath. An etch resistance of 0% means that no cured inkjet ink could be found to be present on the metal substrate after etching. An intermediate percentage, e.g. 80% means that about 80% of the cured inkjet ink could be found to be present on the metal substrate after etching. A good etch resistance means a value of at least 80%. Excellent etch resistance means a value of at least 90% but preferably 100%.

6. Etch Resistance (ER)

The etch resistance was evaluated by rubbing a cotton bud over the layer immediately after etching and rinsing. Evaluation was made in accordance with a criterion described in Table 9.

TABLE 9

| Evaluation | Criterion |
|------------|-----------|
| OK         | Layer not damaged |
| Not OK     | Layer damaged |

7. Strippability (SB) and Flakes

The time of release of the UV curable inkjet printed layer from the metal surface, i.e. the release time, was measured. Evaluation was made in accordance with a criterion described in Table 10.

TABLE 10

| Evaluation | Criterion |
|------------|-----------|
| OK         | Release time of less than 5 minutes |
| Moderate   | Release time of 5 to 10 minutes |
| Not OK     | Release time of more than 10 minutes |

Once the release of the UV curable inkjet printed layer started, the formation of flakes was observed. Evaluation was made in accordance with a criterion described in Table 11.

TABLE 11

| Evaluation | Criterion |
|---|---|
| OK | Flake formation within 5 minutes |
| Moderate | Flake formation within 8 minutes |
| Not OK | No break-down of the inkjetted layer within 20 minutes |

8. Strippability (SB %)

The strippability was evaluated by the determining the percentage of the UV cured inkjet ink layer that 1 was removed from the metal surface after stripping. A strippability of 100% means that the whole cured inkjet ink layer was removed. A strippability of 0% means that no cured inkjet ink could be removed from the metal substrate. An intermediate percentage, e.g. 30% means that only about 30% of the cured inkjet ink could be removed from the metal plate by stripping. A good strippability means a value of at least 80%. Excellent strippability means a value of at least 90% but preferably 100%. A value of 30% or less is a very poor strippability.

9. Adhesion (ADH)

For testing adhesion the cross hatch cutter set Elcometer 1542 was used. The distance between the applied scratches is 1 mm. A 5 cm long strip of Tesatape™ 4104 PVC tape was pressed on to the cross cut inkjet ink. The tape was pressed four times with the thumb before removing it in one sharp pull. The adhesion was then evaluated in accordance with the evaluation values described in Table 12.

TABLE 12

| Evaluation value | Observation |
|---|---|
| 0 | Nothing removed, perfect adhesion. |
| 1 | Detachment of only very small parts of the inkjet ink coating, almost perfect adhesion. |
| 2 | Minor parts of the inkjet ink coating was removed by the tape, good adhesion |
| 3 | Parts of the inkjet ink coating were removed by the tape, poor adhesion. |
| 4 | Most of the inkjet ink coating was removed by the tape, poor adhesion. |
| 5 | The inkjet ink was completely removed from the substrate by the tape, no adhesion. |

10. Viscosity

The viscosity of the formulations was measured at 45° C. using a "Robotic Viscometer Type VISCObot" from CAMBRIDGE APPLIED SYSTEMS.

For industrial inkjet printing, the viscosity is preferably less than 20 mPa·s at 45° C. More preferably the viscosity is less than 15 mPa·s at 45° C.

11. Cure Speed

After printing and curing on the metal surface, the UV cured inkjet ink layer was evaluated by touch of a finger. Evaluation was made in accordance with a criterion described in Table 13.

TABLE 13

| Evaluation | Criterion |
|---|---|
| OK | Layer feels not tacky |
| Not OK | Layer feels tacky or even wet |

Example 1

This example illustrates the manufacturing of a metallic article using UV curable inkjet ink printing, wherein after etching the UV cured image is stripped into flakes.

Preparation of the UV Curable Inkjet Inks

The UV curable inkjet inks Ink-1 to Ink-3 were prepared according to Table 14. The weight percentages (wt %) were all based on the total weight of the UV curable inkjet ink.

TABLE 14

| wt % of component: | Ink-1 | Ink-2 | Ink-3 |
|---|---|---|---|
| SR606A | 40.00 | 42.55 | 41.05 |
| ACMO | 41.05 | 37.50 | 36.00 |
| CEA | 4.95 | 3.00 | 3.00 |
| CN146 | — | 4.00 | — |
| CN823 | — | — | 7.00 |
| INHIB | 1.00 | 1.00 | 1.00 |
| ITX | 4.00 | 4.00 | 4.00 |
| TPO | 4.00 | 2.95 | 2.95 |
| EPD | 4.00 | 4.00 | 4.00 |
| Dye-1 | 1.00 | 1.00 | 1.00 |

Evaluation and Results

Stainless steel 316L plates of 1 mm thickness were cleaned for 10 seconds at 25° C. with a solution called Mecbrite™ CA-95 MH from MEC Europe. The plates were then rinsed with a water jet for 90 seconds.

On a first stainless steel plate, an image of the UV curable inkjet inks INK-1 to INK-3 was printed by means of an Anapurna™ MV inkjet printer equipped with Konica Minolta 512 print heads at 14 pL drop volume in 8 passes (1440×720 dpi) and cured by means of a Hg lamp with an output of 550 mJ/cm².

On a second stainless steel plate, the same image was printed with the UV curable inkjet inks INK-1 to INK-3 at double thickness by the Anapurna™ MV inkjet printer.

The third stainless steel plate was prepared in the same way as the first stainless steel plate, except that an additional heat treatment of 30 minutes at 150° C. was given.

The plates were subjected to an acidic etch bath ("Mega" acid etchant obtained from Mega Electronics, pH 2, contains $FeCl_3$) for 15 minutes at 50° C. The plates were subsequently rinsed for 90 seconds with water and dried. An evaluation of the etch resistance and adhesion was then made.

The etched stainless steel plates were then subjected for 5 minutes at 50° C. to an alkaline strip bath (containing 5% NaOH), then rinsed for 90 seconds with water and dried, and evaluated for strippability and the shape of the stripped ink layer. The relief height was measured by subtracting the thickness of an etched area from an area that was protected by the UV curable inkjet ink. The plates were weighed before and after etching so that the percentage of mass loss by etching could be calculated. The results are shown in Table 15.

TABLE 15

| Plate | Ink | Etching Temp. | ADH | ER % | Stripping SB | Flakes | Relief Height | % mass loss |
|---|---|---|---|---|---|---|---|---|
| 1 | Ink-1 | 50° C. | 5 | 50 | OK | OK | 245 µm | 16% |
|   | Ink-2 |   | 5 | 80 | OK | OK | 277 µm |   |
|   | Ink-3 |   | 5 | 70 | OK | OK | 309 µm |   |
| 2 | Ink-1 | 50° C. | 5 | 100 | OK | OK | 221 µm | 17% |
|   | Ink-2 |   | 5 | 100 | OK | OK | 220 µm |   |
|   | Ink-3 |   | 5 | 100 | OK | OK | 214 µm |   |

TABLE 15-continued

| | | Etching | | Stripping | | Relief | % mass |
|---|---|---|---|---|---|---|---|
| Plate | Ink | Temp. | ADH | ER % | SB | Flakes | Height | loss |
| 3 | Ink-1 | 50° C. | 0 | 100 | OK | OK | 197 μm | 13% |
| | Ink-2 | | 0 | 95 | OK | OK | 208 μm | |
| | Ink-3 | | 1 | 90 | OK | OK | 208 μm | |

From Table 15, it can be seen that after only 15 minutes of etching a relief of about 200 to 300 μm could be created. It can also be seen that inkjet printing the UV curable inkjet ink as a thicker layer increases the etch resistance. Furthermore, it can also be seen that an additional heat treatment of 30 minutes at 150° C. improves the adhesion of the ink layer to the metal surface.

Example 2

This example illustrates UV curable inkjet ink printing, wherein after etching the UV cured image is stripped and solubilised. This avoids the necessity to filter out flakes of the cured ink image.

Preparation of the UV Curable Inkjet Inks

The UV curable inkjet ink C-1 and C-2 and I-1 to I-3 were prepared according to Table 16. The weight percentage (wt %) was based on the total weight of the UV curable inkjet ink. The UV curable inkjet ink C-1 lacks a hydrolyzable polyfunctional monomer or oligomer, while the UV curable inkjet ink C-2 lacks a water absorption controlling monomer.

TABLE 16

| wt % of component: | C-1 | C-2 | I-1 | I-2 | I-3 |
|---|---|---|---|---|---|
| Dye-1 | 1.75 | 1.75 | 1.75 | 1.75 | 1.75 |
| ITX | 5.00 | 5.00 | 5.00 | 5.00 | 5.00 |
| IC907 | 5.00 | 5.00 | 5.00 | 5.00 | 5.00 |
| IC819 | 3.00 | 3.00 | 3.00 | 3.00 | 3.00 |
| TPO | 2.00 | 2.00 | 2.00 | 2.00 | 2.00 |
| INHIB | 1.00 | 1.00 | 1.00 | 1.00 | 1.00 |
| PEG200DA | 52.25 | — | — | — | — |
| HDDA | 30.00 | — | — | — | — |
| VEEA | — | — | — | — | 20.00 |
| PETA | — | — | — | 26.00 | — |
| ACMO | — | — | 52.25 | 26.25 | — |
| HYDRO-8 | — | 52.25 | — | — | 32.25 |
| HYDRO-11 | — | 30.00 | 30.00 | 30.00 | 30.00 |

Evaluation and Results

Isola™ 400 copper plates from CCI Eurolam were cleaned for 5 seconds at 25° C. with a solution called Mecbrite™ CA-95 from MEC Europe, which has pH<1 and contained $H_2SO_4$, $H_2O_2$ and $Cu^{2+}$. During this operation a thin top layer of Cu (0.3-0.5 μm) was removed. The plates were then rinsed with a water jet for 90 seconds.

A pattern of the UV curable inkjet inks C-1, C-2 and I-1 to I-3 was applied at a thickness of 10 μm on the copper plate and cured by a Fusion DRSE-120 conveyer, equipped with a Fusion VPS/I600 lamp (D-bulb), which transported the samples for full curing twice under the UV-lamp on a conveyer belt at a speed of 20 m/min. The maximum output of the lamp was 1.05 $J/cm^2$ and a peak intensity of 5.6 $W/cm^2$.

The plates were subjected to an acidic etch bath ("Mega" acid etchant obtained from Mega Electronics, pH 2, contains $FeCl_3$) for 75 seconds at 35° C. The plates were subsequently rinsed for 90 seconds with water and dried. An evaluation of the etch resistance was then made as shown in Table 17.

The etched copper plates were subjected for 5 minutes at 50° C. to an alkaline strip bath (containing 5% NaOH), then rinsed for 90 seconds with water, dried, and evaluated for strippability and the shape of the stripped ink layer. The results are shown in Table 17.

TABLE 17

| | Etch | Stripping (after 5 min) | |
|---|---|---|---|
| UV Curable Inkjet Ink | Resistance (ER %) | Strippability (SB %) | Visual Shape |
| COMP-1 | 100% | 100% | large flakes |
| COMP-2 | 100% | 100% | small flakes |
| INV-1 | 100% | 100% | fully dissolved |
| INV-2 | 100% | 100% | fully dissolved |
| INV-3 | 100% | 100% | fully dissolved |

From Table 17, it should be clear that the UV curable inkjet inks I-1 to I-3 provided results for etch resistance and strippability that are comparable to those of the comparative UV curable inkjet inks C-1 and C-2, with the exception that the cured ink pattern in the alkaline stripping bath fully dissolved into a blue colored liquid within 5 minutes.

It was found that by replacing the colorant Dye-1 by crystal violet that the colored cured ink image in the alkaline stripping bath fully dissolved into a colourless liquid within 5 minutes. By using crystal violet as a dye that decolorizes at a pH of more than 10, two advantageous effects were obtained. Firstly, the cured ink image could be visually inspected before etching. Secondly, when the stripping solution starts to get colored after multiple strippings, this forms an indication to replace the stripping solution.

Example 3

This example illustrates how the flake formation can be influenced by changing the composition of a UV curable inkjet ink.

Preparation of the UV Curable Inkjet Inks

The UV curable inkjet inks NS-1 to NS-6 and SB-1 to SB-16 were prepared according to a composition of Type A or B in Table 18. The weight percentages (wt %) were all based on the total weight of the UV curable inkjet ink.

TABLE 18

| | wt % in the inkjet ink | |
|---|---|---|
| Components | Type A | Type B |
| Dye-1 | 1.00 | 1.75 |
| Polymerizable composition according to Table 19 | 86.00 | 82.25 |
| ITX | 4.00 | 5.00 |
| EPD | 4.00 | — |
| TPO | 4.00 | 2.00 |
| IC819 | — | 3.00 |
| IC907 | — | 5.00 |
| INHIB | 1.00 | 1.00 |

The amount and type of monomers used in the polymerizable composition of the inkjet inks are shown in Table 19. The weight percentages (wt %) in Table 19 were all based on the total weight of the polymerizable composition. The viscosity of the inks was measured and is shown in Table 20.

TABLE 19

Polymerizable Composition for Table 18

| Inkjet Ink Sample | Type | Acryl Amide | wt % | Polyfunctional acrylate | wt % | Acid acrylate | wt % |
|---|---|---|---|---|---|---|---|
| NS-1 | A | MADAME | 47.7 | SR606A | 46.5 | CEA | 5.8 |
| NS-2 | A | MADAME | 47.7 | DPGDA | 46.5 | CEA | 5.8 |
| NS-3 | A | ACMO | 53.5 | SR606A | 46.5 | CEA | 0.0 |
| NS-4 | B | VEEA | 48.9 | SR606A | 45.0 | CEA | 6.1 |
| NS-5 | B | IDA | 48.9 | SR606A | 45.0 | CEA | 6.1 |
| NS-6 | B | ACMO | 8.8 | SR606A | 85.1 | CEA | 6.1 |
| SB-1 | A | ACMO | 47.7 | SR606A | 46.5 | CEA | 5.8 |
| SB-2 | A | ACMO | 53.5 | SR606A | 40.7 | CEA | 5.8 |
| SB-3 | A | ACMO | 59.3 | SR606A | 34.9 | CEA | 5.8 |
| SB-4 | A | ACMO | 65.1 | SR606A | 29.1 | CEA | 5.8 |
| SB-5 | A | ACMO | 50.6 | SR606A | 46.5 | CEA | 2.9 |
| SB-6 | A | ACMO | 52.3 | SR606A | 46.5 | CEA | 1.2 |
| SB-7 | A | ACMO | 47.7 | DPGDA | 46.5 | CEA | 5.8 |
| SB-8 | A | ACMO | 47.7 | HDDA | 46.5 | CEA | 5.8 |
| SB-9 | A | ACMO | 47.7 | NPGDA | 46.5 | CEA | 5.8 |
| SB-10 | A | ACMO | 47.7 | TMPTA | 46.5 | CEA | 5.8 |
| SB-11 | A | ACMO | 47.7 | PETA | 46.5 | CEA | 5.8 |
| SB-12 | B | ACMO | 33.1 | SR606A | 60.8 | CEA | 6.1 |
| SB-13 | B | ACMO | 21.0 | SR606A | 72.9 | CEA | 6.1 |
| SB-14 | A | ACMO | 41.9 | SR606A | 46.5 | CEA | 11.6 |

Evaluation and Results

Isola™ IS400 copper plates from CCI Eurolam were cleaned for 5 seconds at 25° C. with a solution called Mecbrite™ CA-95 from MEC Europe, which has pH<1 and contained $H_2SO_4$, $H_2O_2$ and $Cu^{2+}$. During this operation a thin top layer of Cu (0.3-0.5 µm) was removed. The plates were then rinsed with a water jet for 90 seconds.

A pattern of the UV curable inkjet inks NS-1 to NS-6 and SB-1 to SB-16 was printed unidirectional by means of an Anapurna™ M inkjet printer equipped with Konica Minolta 512 print heads at 14 pL drop volume in 8 passes (1440×720 dpi) and cured by means of an Fe doped Hg lamp with an output of 550 mJ/cm². An evaluation for cure speed was made and the result is shown in Table 20.

The plates were subjected to an acidic etch bath ("Mega" acid etchant obtained from Mega Electronics, pH 2, contains $FeCl_3$) for 115 seconds at 35° C. The plates were subsequently rinsed for 90 seconds with water and dried. An evaluation of the etch resistance was then made as shown in Table 20.

The strippability (SB) was determined using the etched and dried samples by submitting into a beaker containing 6.25% NaOH-solution at 50° C. and stirred. The time of release of the inkjetted layer from the metal surface, i.e. the release time, was measured.

TABLE 20

| Inkjet Ink | Viscosity (mPa · s) | Cure Speed | Etch Resistance (ER) | Strippability (SB) | Flakes |
|---|---|---|---|---|---|
| NS-1 | 4 | Not OK | OK | OK | OK |
| NS-2 | 3 | Not OK | OK | OK | OK |
| NS-3 | 8 | OK | OK | Not OK | OK |
| NS-4 | 7 | OK | OK | Not OK | OK |
| NS-5 | 7 | OK | OK | Not OK | OK |
| NS-6 | 15 | OK | OK | Not OK | Moderate |
| SB-1 | 9 | OK | OK | OK | OK |
| SB-2 | 9 | OK | OK | OK | OK |
| SB-3 | 9 | OK | OK | OK | OK |
| SB-4 | 8 | OK | OK | OK | OK |
| SB-5 | 9 | OK | OK | OK | OK |
| SB-6 | 9 | OK | OK | Moderate | OK |
| SB-7 | 7 | OK | OK | OK | OK |
| SB-8 | 6 | OK | OK | OK | OK |
| SB-9 | 6 | OK | OK | OK | OK |
| SB-10 | 13 | OK | OK | OK | OK |
| SB-11 | 20 | OK | OK | OK | OK |
| SB-12 | 14 | OK | OK | OK | OK |
| SB-13 | 14 | OK | OK | OK | OK |
| SB-14 | 11 | OK | OK | OK | OK |

From Table 20, it should be clear that only the UV curable inkjet inks SB-1 to SB-16 complying with the specific composition mentioned above for "Strippable UV curable Inkjet Inks" exhibited excellent results. By replacing the acrylamide ACMO by other monomers that are equally hydrophilic but are (meth)acrylates, or by ignoring the ranges for the acryl amide, the polyfunctional acrylate and the acid monomer, the UV curable inkjet inks failed on one or more of the requirements for manufacturing metallic articles.

Example 4

This example illustrates the manufacturing of a fine screen as metallic article from a stainless steel plate and using UV LED curing for obtaining a high image quality.

Preparation of the UV Curable Inkjet Ink

The UV curable inkjet ink Ink-2 of Example 1 was taken as the UV curable inkjet ink LED-1 used in this experiment.

Preparation of Metallic Article

One side of a 200 µm thick stainless steel 302 plate was coated over its whole surface with the UV curable inkjet ink LED-1 using a bar coater and a 10 µm wired bar. The coated sample was UV cured using a Fusion DRSE-120 conveyer, equipped with a Fusion VPS/1600 lamp (D-bulb). The sample was passed under the lamp once at a belt speed of 20 m/min and at full power of the lamp.

An image leaving in an oval shape multiple small rectangular areas of unprotected metallic surface for forming a fine screen was inkjet printed using a MJK 2013K1 inkjet printing system from MicroCraft with a KM1024S print head and the UV curable inkjet ink LED-1 on the opposite side of the 200 µm thick stainless steel plate coated with the UV curable inkjet ink LED-1. The image was printed in 8 passes in a resolution of 720×1440 dpi with UV curing after each of the passes using a 395 nm SubZero LED 090 from Integration Technology.

The UV cured sample was then given a heat treatment by putting it in an oven for 15 minutes at 150° C. for maximizing the adhesion.

The sample was then etched using an acidic etch bath ("Mega" acid etchant obtained from Mega Electronics, pH 2, contains $FeCl_3$) for 20 minutes at 50° C. The etched sample was subsequently rinsed for 90 seconds with water before stripping. The UV cured image on the front and back side was fully stripped from the metallic surface using a PILL line and brushing with a 3% NaOH-solution at 50° C. The result was an oval fine screen having decreasing pore sizes from top to bottom as can be seen on the photograph of FIG. 5.

Example 5

This example illustrates the UV LED curability of a UV curable inkjet ink, wherein after etching the UV cured image is solubilized. This avoids the necessity to filter out flakes of the cured ink image.

Preparation of the UV Curable Inkjet Inks

The UV curable inkjet inks LED-2 to LED-7 were prepared according to Table 22. The weight percentages (wt %) were all based on the total weight of the UV curable inkjet ink.

TABLE 22

| wt % of component: | LED-2 | LED-3 | LED-4 | LED-5 | LED-6 | LED-7 |
|---|---|---|---|---|---|---|
| ACMO | 22.25 | 26.00 | 31.00 | 36.00 | 21.00 | 21.00 |
| HYDRO-8 | 41.00 | 36.00 | 31.00 | 26.00 | 39.00 | 39.00 |
| HYDRO-11 | 23.25 | 23.25 | 23.25 | 23.25 | 23.25 | 23.25 |
| CEA | — | — | — | — | 2.00 | — |
| SUC | — | — | — | — | — | 2.00 |
| INHIB | 1.00 | 1.00 | 1.00 | 1.00 | 1.00 | 1.00 |
| ITX | 4.00 | 4.00 | 4.00 | 4.00 | 4.00 | 4.00 |
| TPO | 4.00 | 4.00 | 4.00 | 4.00 | 4.00 | 4.00 |
| EPD | 4.00 | 4.00 | 4.00 | 4.00 | 4.00 | 4.00 |
| Crystal Violet | 0.50 | 1.75 | 1.75 | 1.75 | 1.75 | 1.75 |
| Viscosity (mPa · s) | 16 | 17 | 14 | 14 | 18 | 18 |

Evaluation and Results

Isola™ 400 copper plates from CCI Eurolam were cleaned for 5 seconds at 25° C. with a solution called Mecbrite™ CA-95 from MEC Europe, which has pH<1 and contained $H_2SO_4$, $H_2O_2$ and $Cu^{2+}$. During this operation a thin top layer of Cu (0.3-0.5 μm) was removed. The plates were then rinsed with a water jet for 90 seconds.

An image of the UV curable inkjet inks LED-2 to LED-7 was inkjet printed using a MJK 2013K1 inkjet printing system from MicroCraft equipped with a KM1024S print head. The image was UV cured using a 395 nm SubZero LED 090 from Integration Technology.

The plates were subjected to an acidic etch bath ("Mega" acid etchant obtained from Mega Electronics, pH 2, contains $FeCl_3$) for 75 seconds at 35° C. The plates were subsequently rinsed for 90 seconds with water and dried. The adhesion was determined and the results are shown in Table 23.

The etched copper plates were subjected at 50° C. to an alkaline strip bath (containing 6.25% NaOH) under constant stirring and each minute evaluated for the shape of the stripped ink layer. The results are shown in Table 23.

TABLE 23

| Inkjet Ink | Adhesion | Fully solubilized after: |
|---|---|---|
| LED-2 | 0 | 5 minutes stirring |
| LED-3 | 0 | 5 minutes stirring |
| LED-4 | 0 | 2 minutes stirring |
| LED-5 | 0 | 2 minutes stirring |
| LED-6 | 1 | 2 minutes stirring |
| LED-7 | 1 | 5 minutes stirring |

Table 23 shows that the UV LED cured images exhibited good adhesion after etching and were all solubilised after 5 minutes of stirring in the alkaline strip bath.

REFERENCE SIGNS LIST

FIGS. 1 to 4 use the following reference signs.

TABLE 24

| 1 | Metal substrate |
|---|---|
| 2 | UV cured image |
| 3 | Metal protected by the UV cured image |
| 4 | Metallic relief |
| 5 | Metallic article |
| 6 | Deposited metal |
| 7 | Second UV cured image |
| 8 | Non strippable UV cured image |
| 9 | Second metallic relief |
| 10 | Frame |
| 11 | Etchant inlet |
| 12-14 | Etchant flow direction |
| 15 | Etchant outlet |
| 16 | Hole |

The invention claimed is:

1. A method of manufacturing a metallic article from a metallic substrate, the method comprising the steps of:
   a) jetting an image with a UV curable inkjet ink on at least one surface of the metallic substrate;
   b) UV curing the jetted image;
   c) electroplating or acidic etching the at least one surface not covered by the UV cured image; and
   d) stripping or solubilizing the UV cured image with an aqueous alkaline solution; wherein
   the UV curable inkjet ink has a viscosity of no more than 100 mPa·s at 25° C. and at a shear rate of 1,000 $S^{-1}$;
   the UV curable inkjet ink includes up to 20 wt % of photoinitiator including at least one of an acyl phosphine oxide photoinitiator and a thioxanthone photoinitiator, and a polymerizable composition selected from the group consisting of:
     a polymerizable composition A, wherein at least 80 wt % of the polymerizable composition consists of:
       15.0 to 70.0 wt % of an acryl amide;
       20.0 to 75.0 wt % of a polyfunctional acrylate; and
       1.0 to 15.0 wt % of a monofunctional (meth)acrylate including a carboxylic acid group; wherein
       all weight percentages (wt %) are based on a total weight of the polymerizable composition; and
     a polymerizable composition B including:
       one or more hydrolyzable polyfunctional monomers or oligomers including at least one alkali hydrolyzable group located in an atomic chain between two polymerizable groups of the polyfunctional monomer or oligomer; and
       one or more water absorption controlling monomers that are a monofunctional or difunctional monomer containing at least one functional group selected from the group consisting of a hydroxyl group, an ethylene oxide or oligo-ethylene oxide group, a tertiary amine group, an acidic group having a $pK_a$ not lower than 3, and a five to seven membered aromatic or non aromatic heterocyclic group.

2. The method according to claim 1, wherein the metallic substrate is selected from the group consisting of iron, nickel, cobalt, copper, silver, gold, tantalum, aluminum, molybdenum, tungsten, tin, zinc, chromium, titanium, and alloys thereof.

3. The method according to claim 1, wherein, before or after step d):

jetting a second image with a UV curable inkjet ink on at least one surface of the metallic substrate;
UV curing the second image on the at least one surface of the metallic substrate; and
electroplating or acidic etching the metallic substrate.

4. The method according to claim 1, further comprising the steps of:
jetting a UV curable inkjet ink including a colorant on at least one surface of the metallic substrate;
UV curing the UV curable inkjet ink including the colorant; wherein
the UV curable inkjet ink including the colorant is not removed by stripping or solubilizing with the aqueous alkaline solution.

5. The method according to claim 4, wherein the UV curable inkjet ink including the colorant is jetted before step c).

6. The method according to claim 1, wherein the UV cured image is solubilized by the aqueous alkaline solution.

7. The method according to claim 1, wherein the at least one alkali hydrolyzable group located in the atomic chain between the two polymerizable groups of the polyfunctional monomer or oligomer is selected from the group consisting of Formulas H-1 to H-4:

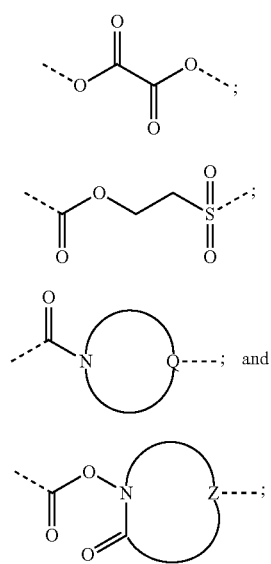

wherein
Q represents necessary atoms to form a five membered aromatic ring group;
Z represents necessary atoms to form a five or six membered ring group; and
dashed lines represent bonds to a remainder of the polyfunctional monomer or oligomer.

8. The method according to claim 7, wherein the at least one alkali hydrolyzable group H-3 is selected from the group consisting of an imidazole group, a benzimidazole group, a triazole group, and a benzotriazole group; and
the at least one alkali hydrolyzable group H-4 is selected from the group consisting of a succinimid group and a phtalimid group.

9. The method according to claim 6, wherein the one or more hydrolyzable polyfunctional monomers or oligomers includes a difunctional polyfunctional monomer or oligomer including an oxalate group as the least one alkali hydrolyzable group.

10. The method according to claim 1, wherein the UV curable inkjet ink including the polymerizable composition B includes a colorant which decolorizes at a pH of more than 10.

11. The method according to claim 1, wherein the acryl amide of the polymerizable composition A is acryloyl morpholine.

12. The method according to claim 11, wherein the monofunctional (meth)acrylate including the carboxylic acid group is 2-carboxyethyl acrylate.

13. The method according to claim 1, wherein the UV curable inkjet ink includes 0 to 0.05 wt % of a surfactant based on a total weight of the UV curable inkjet ink.

14. The method according to claim 1, wherein the step of UV curing includes curing with UV LEDs.

15. The method according to claim 1, wherein the metallic article is selected from the group consisting of die cutting tools, fine screens and meshes, apertures and masks, battery grids, fuel cell components, sensors, springs, pressure membranes, heat sinks, heating elements, mechanical components, semiconductor lead frames, motor and transformer laminations, metal gaskets and seals, shields and retainers, electrical contacts, encoders and light choppers, EMI/RFI shields, jewellery, washers, filters, spectacle frames, art objects, keys, tools, toys, coins, business cards, and other readable objects.

* * * * *